(12) United States Patent
Kimpara et al.

(10) Patent No.: US 8,525,454 B2
(45) Date of Patent: Sep. 3, 2013

(54) CONTROLLER FOR AC ROTARY MACHINE

(75) Inventors: Yoshihiko Kimpara, Tokyo (JP); Masato Ito, Tokyo (JP); Masanori Tanimoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 192 days.

(21) Appl. No.: 13/255,738

(22) PCT Filed: Mar. 26, 2009

(86) PCT No.: PCT/JP2009/001345
§ 371 (c)(1),
(2), (4) Date: Sep. 9, 2011

(87) PCT Pub. No.: WO2010/109528
PCT Pub. Date: Sep. 30, 2010

(65) Prior Publication Data
US 2012/0001573 A1    Jan. 5, 2012

(51) Int. Cl.
*H02P 21/00* (2006.01)
(52) U.S. Cl.
USPC ..................... 318/400.02; 318/727
(58) Field of Classification Search
USPC ............... 318/400.02, 727, 798, 799, 805, 318/806
See application file for complete search history.

(56) References Cited

U.S. PATENT DOCUMENTS

| 6,518,722 | B1 * | 2/2003 | Giuseppe | 318/727 |
| 6,771,039 | B2 * | 8/2004 | Sakurai et al. | 318/722 |
| 6,825,637 | B2 | 11/2004 | Kinpara et al. | |
| 6,933,701 | B2 | 8/2005 | Kinpara et al. | |
| 7,728,537 | B2 * | 6/2010 | Tomigashi | 318/400.02 |
| 7,772,790 | B2 * | 8/2010 | Nashiki | 318/400.02 |
| 2010/0194319 | A1 | 8/2010 | Ito et al. | |

FOREIGN PATENT DOCUMENTS

| JP | 4 101691 | 4/1992 |
| JP | 8 168300 | 6/1996 |
| JP | 10 094298 | 4/1998 |
| JP | 2000 78878 | 3/2000 |
| JP | 2006 158046 | 6/2006 |
| JP | 2008 11625 | 1/2008 |
| JP | 2009 60688 | 3/2009 |
| WO | 02 091558 | 11/2002 |

OTHER PUBLICATIONS

International Search Report issued Jun. 23, 2009 in PCT/JP09/001345 filed Mar. 26, 2009.

* cited by examiner

*Primary Examiner* — Rina Duda
(74) *Attorney, Agent, or Firm* — Oblon, Spivak, McClelland, Maier & Neustadt, L.L.P.

(57) ABSTRACT

A controller for an AC rotary machine which performs a smooth drive from a low-speed region including zero speed to a high-speed region, and which can attain, even if an initial value error is present in an estimated phase, desired characteristics by promptly converging the error. An adaptive observation mechanism outputs an estimated magnetic flux phase, an estimated current vector, an estimated magnetic flux vector, and an estimated speed, based on a voltage instruction vector, a current deviation vector, and an amplified deviation vector; a deviation vector calculator calculates the current deviation vector between the estimated current vector and a detected current vector from a current vector detector, and a magnetic flux deviation vector between the estimated magnetic flux vector and a detected magnetic flux vector from a magnetic flux vector detector; and a deviation amplifier amplifies the current deviation vector and the magnetic flux deviation vector, and outputs the result as the amplified deviation vector.

12 Claims, 23 Drawing Sheets

CONTROLLER FOR AC ROTARY MACHINE

TECHNICAL FIELD

The present invention relates to a device for controlling drive of an AC rotary machine by applying an AC voltage by means of voltage application means.

BACKGROUND ART

A variety of methods for controlling an AC rotary machine such as a synchronous machine and an induction machine are known. In a low-speed region only, an AC rotary machine can be driven in a low-cost control system using an inexpensive position sensor whose responsiveness is low in general. Since the output cycle of a Hall sensor itself is slow in a low-speed region, even if a position sensor having a low responsiveness is used, the lowness of responsiveness is not so conspicuous, and thus, such a position sensor can be used for the drive.

Meanwhile, in a case where a position sensor having a low responsiveness is to be used in a high-rotation region, a current cannot be supplied so as to have a desired phase due to the slowness, and the drive characteristics of the AC rotary machine are reduced. If a voltage or a current having a higher frequency than the fundamental frequency of the AC rotary machine is superimposed and the AC rotary machine is controlled based on a result of a position detection using the saliency of the inductance, the AC rotary machine can be driven in a low-speed region without using a position sensor. However, if this method is used to drive the AC rotary machine in a high-rotation region, voltages or currents having a frequency other than the fundamental frequency are generated, which results in disadvantages in terms of the operation efficiency, the voltage utilization rate, and the maximum current.

Therefore, a variety of controllers for an AC rotary machine have been introduced which can smoothly drive the AC rotary machine through sensor-less control, from a low-speed region to a high-speed region.

For example, in the invention disclosed in Patent Literature 1, in order to appropriately generate a phase of a rotational d-q coordinate system required at a basic section of a vector controller without using a magnetic pole position detector, a low-frequency region phase generator for generating a phase for a low-frequency region and a high-frequency region phase generator for generating a phase for a high-frequency region are provided. Then, a phase synthesizer for synthesizing these two types of phases by averaging the phases while weighting the phases by frequency is provided and the synthesized final phase is employed as the phase of the rotational d-q coordinate system.

According to the invention disclosed in Patent Literature 2, in a sensor-less control method for controlling an AC electric motor continuously from zero speed to a high-speed region, a speed estimation value west and a position estimation value θest estimated by a position/speed estimator using a mechanical mathematical expression model are used to perform control such that a position error Δθ becomes zero which is obtained by an exterior product calculation of a first magnetic flux vector calculated by using a rotor angle and a second magnetic flux vector calculated without using the rotor angle.

Further, the invention disclosed in Patent Literature 3 includes an adaptive observer which uses an electric motor model which calculates an angular frequency, an estimated current, and an estimated rotor magnetic flux, based on a current deviation on a rotational two-axis coordinate system (d-q axes), a voltage instruction on the rotational two-axis coordinate system (d-qaxes), and an estimated rotational speed, thereby realizing control of a synchronous electric motor at an especially high rotational speed.

These inventions are considered to be able to smoothly drive an AC rotary machine from a low-speed region to a high-speed region.

Patent Literature 1: Japanese Laid-open Patent Publication No. 10-94298
Patent Literature 2: Japanese Laid-open Patent Publication No. 2006-158046
Patent Literature 3: Republished WO2002/091558

DISCLOSURE OF THE INVENTION

Problems to be Solved by the Invention

However, since the invention disclosed in Patent Literature 1 synthesizes the two types of phases by averaging the frequencies while weighting, the drive is needed to be performed based on the lower frequency region phase generator of the generators for the two types of phases, in a low-speed region where the frequency is low. As a result, there is a problem in that when the estimated response of the lower frequency region phase generator is slow, the responsiveness such as a speed control response or a torque control response cannot be maintained at a high level, in a low-speed region.

Moreover, in the invention disclosed in Patent Literature 2, the speed estimation value west and the position estimation value θest are used by the position/speed estimator such that the position error Δθ becomes zero which is obtained by the exterior product calculation of the first magnetic flux vector and the second magnetic flux vector. The exterior product calculation varies insensitivity depending on the phase difference between the first magnetic flux vector and the second magnetic flux vector. In particular, when the phase difference exceeds 90 degrees, the exterior product calculation value becomes small, irrespective of the fact that the deviation is larger than that when the phase difference is less than 90 degrees. Therefore, there is a problem in the error convergence characteristic and the position estimation responsiveness if the phase difference exceeds 90 degrees due to initial value errors or some other reasons.

Moreover, in the invention disclosed in Patent Literature 3, the adaptive observer performs the calculation based on the current deviation. Therefore, there is a problem in that in a case where the AC rotary machine is stopped or in operation at a very low rotational speed, there occurs little or no current deviation, causing difficulty in smooth control.

The present invention is made to solve the above problems and an object of the present invention is to provide a controller for an AC rotary machine which smoothly drives the AC rotary machine from a low-speed region including zero speed to a high-speed region and which can obtain, even when an initial value error is present in an estimated phase, desired characteristics by promptly converging the error.

Solution to the Problems

A controller for an AC rotary machine according to a first aspect of the present invention is directed to a controller for an AC rotary machine, the controller including: current vector detection means for detecting a current vector of the AC rotary machine and outputting the current vector as a detected current vector; AC rotary machine control means for referring to an estimated magnetic flux phase and outputting a voltage instruction vector such that the detected current vector coincides with a current instruction vector; voltage application means for applying a voltage to the AC rotary machine based on the voltage instruction vector; adaptive observation means for outputting the estimated magnetic flux phase based on the voltage instruction vector; and magnetic flux vector detection means for detecting a magnetic flux vector and outputting the magnetic flux vector as a detected magnetic flux vector, wherein the adaptive observation means outputs an estimated current vector and an estimated magnetic flux vector in addition to the estimated magnetic flux phase, based on a current deviation vector and an amplified deviation vector in addition to the voltage instruction vector, and the controller further includes deviation vector calculation means for calculating the current deviation vector which is a deviation between the estimated current vector and the detected current vector and a magnetic flux deviation vector which is a deviation between the estimated magnetic flux vector and the detected magnetic flux vector and for outputting the calculated current deviation vector and the calculated magnetic flux deviation vector as the amplified deviation vector.

The controller for an AC rotary machine according to a second aspect of the present invention is directed to a controller for an AC rotary machine, the controller including: current vector detection means for detecting a current vector of the AC rotary machine and outputting the current vector as a detected current vector; AC rotary machine control means for referring to an estimated magnetic flux phase and outputting a voltage instruction vector such that the detected current vector coincides with a current instruction vector; voltage application means for applying a voltage to the AC rotary machine based on the voltage instruction vector; adaptive observation means for outputting the estimated magnetic flux phase based on the voltage instruction vector; and magnetic flux vector detection means for detecting a magnetic flux vector and outputting the magnetic flux vector as a detected magnetic flux vector, wherein the adaptive observation means outputs an estimated magnetic flux vector in addition to the estimated magnetic flux phase, based on an amplified deviation vector in addition to the voltage instruction vector, and the controller further includes deviation vector calculation means for calculating a magnetic flux deviation vector which is a deviation between the estimated magnetic flux vector and the detected magnetic flux vector and for outputting the calculated magnetic flux deviation vector as the amplified deviation vector.

Effect of the Invention

As described above, the controller for an AC rotary machine according to the first and second aspects of the present invention includes deviation vector calculation means for calculating a magnetic flux deviation vector which is a deviation between the estimated magnetic flux vector and the detected magnetic flux vector, and the output is inputted to the adaptive observation means. Therefore, irrespective of the magnitude of the rotational speed, the AC rotary machine can be controlled by means of an estimated magnetic flux phase which is based on the estimated magnetic flux vector estimated by the adaptive observation means, and the responsiveness such as a speed control response can be maintained at a high level even in a low-speed region including zero speed, and in addition, when there is an initial value error, the error convergence characteristic can be improved.

BEST MODE FOR CARRYING OUT THE INVENTION

Embodiment 1

Figure 1:
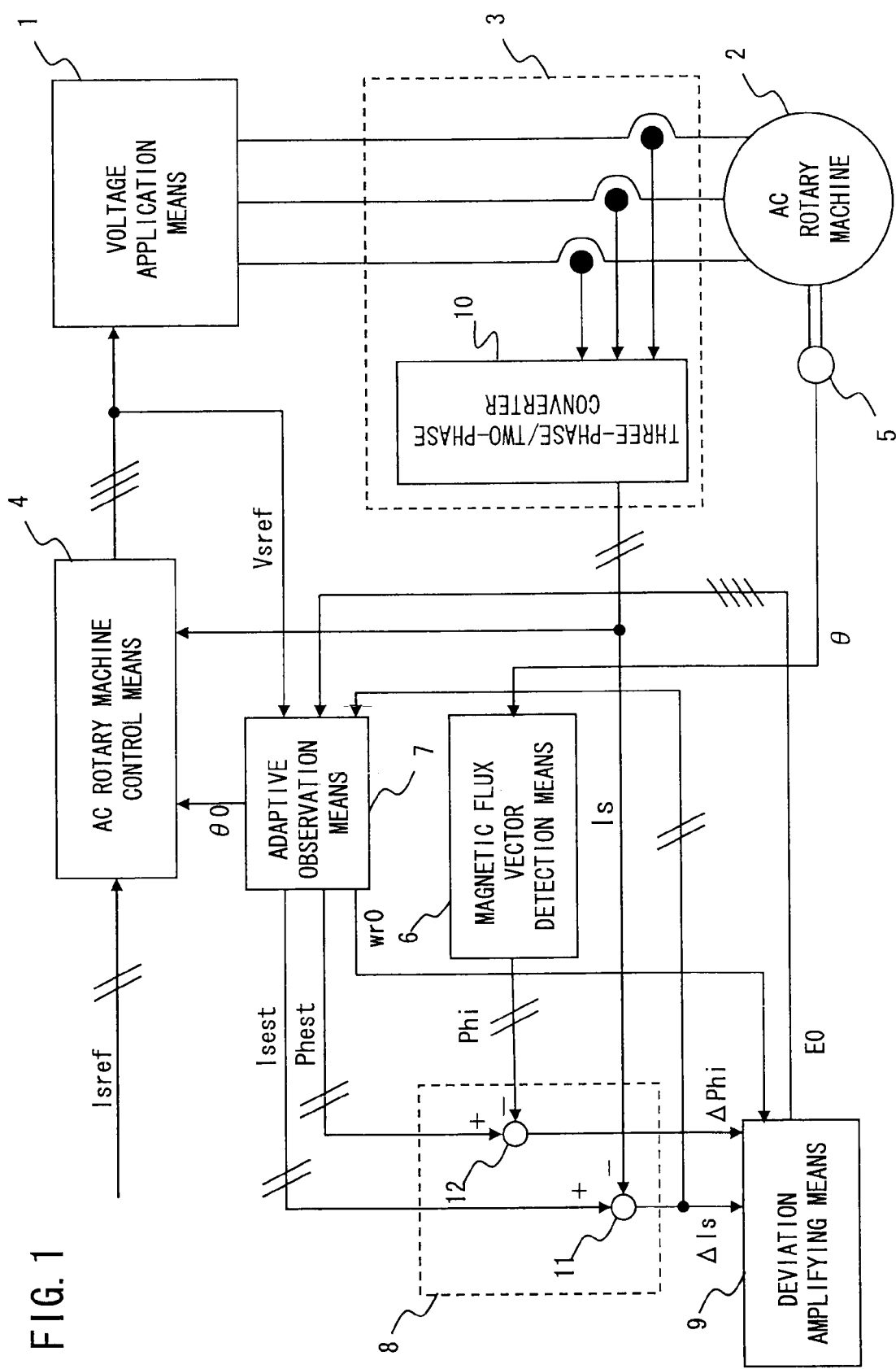
FIG. 1 is a diagram showing an entire configuration of a controller of an AC rotary machine according to embodiment 1 of the present invention.

FIG. 1 is a diagram showing an entire configuration according to the present embodiment 1. In FIG. 1, voltage application means 1 applies a voltage to an AC rotary machine 2 based on a voltage instruction vector Vsref. In the present embodiment 1, description will be given, using a synchronous machine as an example of the AC rotary machine 2. However, an induction machine can also be configured, using the same principle.

Current vector detection means 3 detects a current vector of the AC rotary machine 2 and outputs the current vector as a detected current vector Is. AC rotary machine control means 4 outputs the voltage instruction vector Vsref to the voltage application means 1 such that the detected current vector Is obtained from the current vector detection means 3 coincides with a current instruction vector Isref. Rotational position detection means 5 detects a rotational position of the AC rotary machine 2 and outputs the detected rotational position to magnetic flux vector detection means 6, and the magnetic flux vector detection means 6 detects a magnetic flux vector based on the rotational position, and outputs the magnetic flux vector as a detected magnetic flux vector Phi.

Adaptive observation means 7 outputs an estimated magnetic flux phase θ0, an estimated current vector Isest, an estimated magnetic flux vector Phest, and an estimated speed wr0, based on an amplified deviation vector ΔIs described below, a current deviation vector ΔIs described below, and the voltage instruction vector Vsref. Deviation vector calculation means 8 outputs the current deviation vector ΔIs based on the estimated current vector Isest and the detected current vector Is, and also outputs a magnetic flux deviation vector ΔPhi based on the estimated magnetic flux vector Phest and the detected magnetic flux vector Phi. Deviation amplifying means 9 amplifies the current deviation vector ΔIs and the magnetic flux deviation vector ΔPhi using the estimated speed wr0 as a parameter, and outputs the result as the amplified deviation vector E0 to the adaptive observation means 7.

The current vector detection means 3 outputs a result of conversion of three-phase AC currents into two-phase AC currents performed by a three-phase/two-phase converter 10, as the detected current vector Is. The coordinate system for handling the two-phase AC currents outputted by the three-phase/two-phase converter 10 is known as an orthogonal two-axis coordinate system of rest, and the orthogonal two-axis coordinate system of rest is defined as a-b axes.

In the deviation vector calculation means 8, a subtractor 11 subtracts the detected current vector Is from the estimated current vector Isest and outputs the current deviation vector ΔIs, and a subtractor 12 subtracts the detected magnetic flux vector Phi from the estimated magnetic flux vector Phest, and outputs the magnetic flux deviation vector ΔPhi.

Now, the function of the adaptive observation means 7 is described again.

That is, it is important for the AC rotary machine control means 4, for its controlling performance, to accurately obtain the estimated magnetic flux phase θ0, which is required when the AC rotary machine control means 4 outputs the voltage instruction vector Vsref such that the detected current vector Is coincides with the current instruction vector Isref.

Therefore, the primary function of the adaptive observation means 7 is to accurately generate the estimated magnetic flux phase θ0. When it is assumed that a rotational speed of the AC rotary machine 2 is the estimated speed wr0 from the adaptive observation means 7, the adaptive observation means 7 outputs a current vector and a magnetic flux vector generated when the voltage instruction vector Vsref is applied to the AC rotary machine 2, as the estimated current vector Isest and the estimated magnetic flux vector Phest, respectively. Since the estimated magnetic flux phase θ0 is a phase of the estimated magnetic flux vector Phest, if the estimated magnetic flux vector Phest outputted by the adaptive observation means 7 is made to coincide with a magnetic flux vector Ph of the AC rotary machine 2, it contributes improvement of the controlling performance.

In a case where the rotational speed of the AC rotary machine 2 and the estimated speed wr0 outputted by the adaptive observation means 7 are different from each other, the current deviation vector ΔIs and the magnetic flux deviation vector ΔPhi are generated. Therefore, by using this, the estimated speed wr0 is corrected through so-called feedback control such that the estimated speed wr0 coincides with the rotational speed of the AC rotary machine 2. If the estimated speed wr0 is successfully made to coincide with the rotational speed of the AC rotary machine 2, the estimated magnetic flux vector Phest outputted by the adaptive observation means 7 also coincides with the magnetic flux vector Ph of the AC rotary machine 2, and accordingly, the estimated magnetic flux phase θ0 with a high accuracy can be obtained.

As understood from the above description, for the feedback control in the adaptive observation means 7, it is important how accurately the deviation (the magnetic flux deviation vector ΔPhi) between the detected magnetic flux vector Phi and the estimated magnetic flux vector Phest is obtained.

Therefore, the characteristics of the magnetic flux deviation vector ΔPhi will be described further in detail with reference to FIG. 2.

Figure 2:
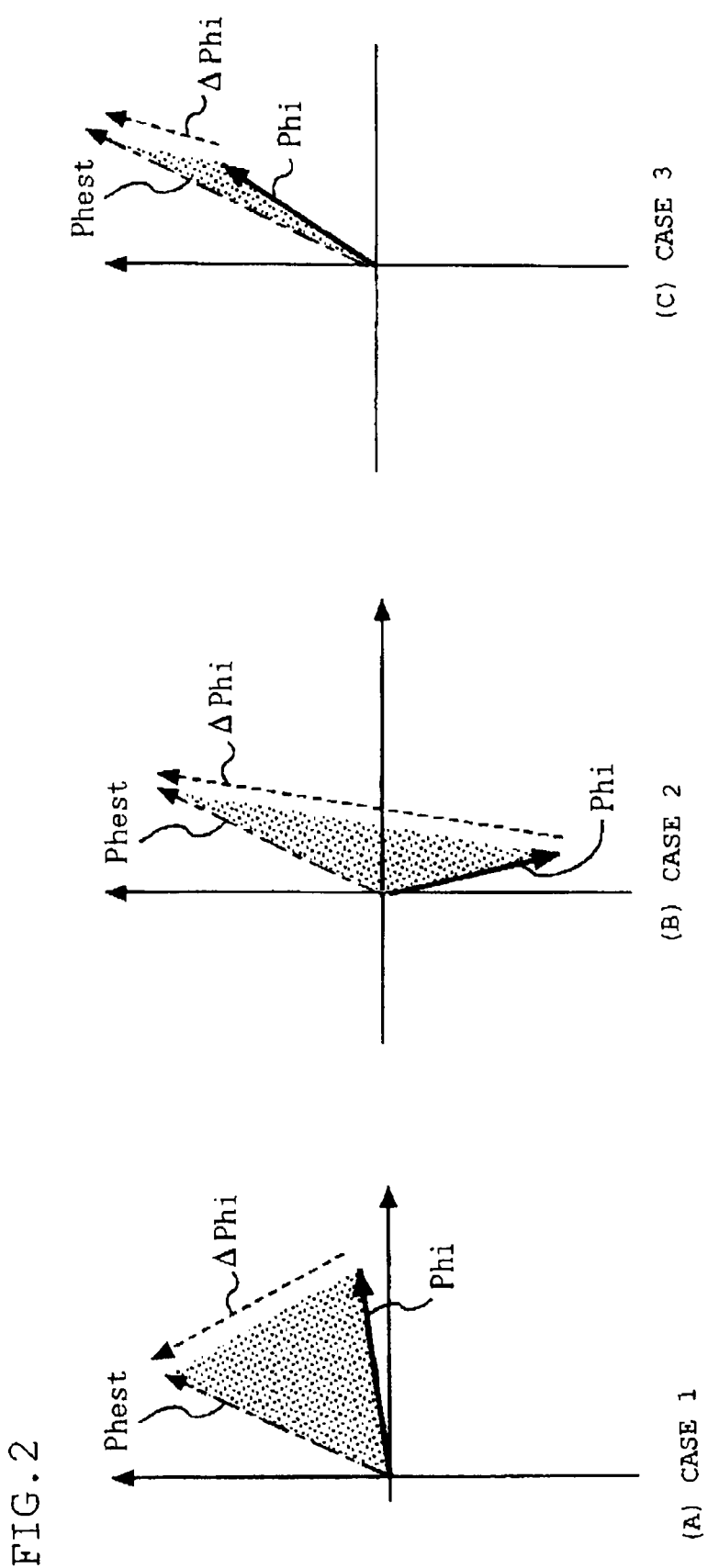
FIG. 2 is a diagram illustrating characteristics of magnetic flux deviation vectors.

In case 1 in FIG. 2(*a*), the estimated magnetic flux vector Phest is a leading phase relative to the detected magnetic flux vector Phi and the phase difference is within 90 degrees. The magnetic flux deviation vector ΔPhi is obtained by subtracting the detected magnetic flux vector Phi (the thick line in the drawing) from the estimated magnetic flux vector Phest (the chain line in the drawing), and appears as the dashed line in the drawing. Accordingly, as in an example shown in Patent Literature 2 described above, a value obtained by an exterior product calculation of the estimated magnetic flux vector Phest and the detected magnetic flux vector Phi is proportional to the area of the triangle (the hatched portion in the drawing) created by the estimated magnetic flux vector Phest and the detected magnetic flux vector Phi.

Therefore, if a phase difference is generated between the estimated magnetic flux vector Phest and the detected magnetic flux vector Phi, the magnetic flux deviation vector ΔPhi will be generated, and a value obtained by an exterior product calculation of the estimated magnetic flux vector Phest and the detected magnetic flux vector Phi will be generated.

Next, case 2 in FIG. 2(*b*) will be considered. In case 2, the estimated magnetic flux vector Phest is a leading phase relative to the detected magnetic flux vector Phi, and the phase difference is 90 degrees or more. The magnitude of the magnetic flux deviation vector ΔPhi (the dashed line in the drawing), which is obtained by subtracting the detected magnetic flux vector Phi (the thick line in the drawing) from the estimated magnetic flux vector Phest (the chain line in the drawing), is greater than that of the magnetic flux deviation vector ΔPhi in case 1. Meanwhile, a value obtained by an exterior product calculation of the estimated magnetic flux vector Phest and the detected magnetic flux vector Phi, which value is proportional to the area of the hatched portion in the drawing, is smaller than that in case 1.

As described above, the value obtained by an exterior product calculation of the estimated magnetic flux vector Phest and the detected magnetic flux vector Phi does not necessarily become large in accordance with an increase of the phase difference between the estimated magnetic flux vector Phest and the detected magnetic flux vector Phi. Thus, the value obtained by the exterior product calculation cannot be considered as accurately reflecting the magnitude of the phase difference between the estimated magnetic flux vector Phest and the detected magnetic flux vector Phi.

However, when the phase difference between the estimated magnetic flux vector Phest and the detected magnetic flux vector Phi is increased, the magnitude of the magnetic flux deviation vector ΔPhi is also increased accordingly. Therefore, the magnetic flux deviation vector ΔPhi can be considered as accurately reflecting the magnitude of the phase difference between the estimated magnetic flux vector Phest and the detected magnetic flux vector Phi.

Next, case 3 in FIG. 2(c) will be considered. In case 3, the estimated magnetic flux vector Phest is a leading phase relative to the detected magnetic flux vector Phi, and the phase difference is small but the magnitude of the estimated magnetic flux vector Phest is estimated so as to be larger than that of the detected magnetic flux vector Phi. The magnetic flux deviation vector ΔPhi (the dashed line in the drawing), which is obtained by subtracting the detected magnetic flux vector Phi (the thick line in the drawing) from the estimated magnetic flux vector Phest (the chain line in the drawing), assuredly has a magnitude, but when the phase difference is small, a value obtained by the above-described exterior product calculation as described above will not be assured any more.

As described above, the controller of an AC rotary machine according to the present embodiment 1 determines the estimated magnetic flux vector Phest of the AC rotary machine 2 based on the magnetic flux deviation vector ΔPhi, without performing the exterior product calculation as shown in Patent Literature 2. Therefore, even when the phase difference between the estimated magnetic flux vector Phest and the detected magnetic flux vector Phi exceeds 90 degrees due to an initial value error or a disturbance or even when the phase difference is small, it is possible to maintain the error convergence characteristic and the responsiveness of the position estimation. As a result, it is possible to control the drive of the AC rotary machine 2 stably, which is an effect.

Further, the configuration of each component shown in FIG. 1 will be described in detail.

Figure 3:
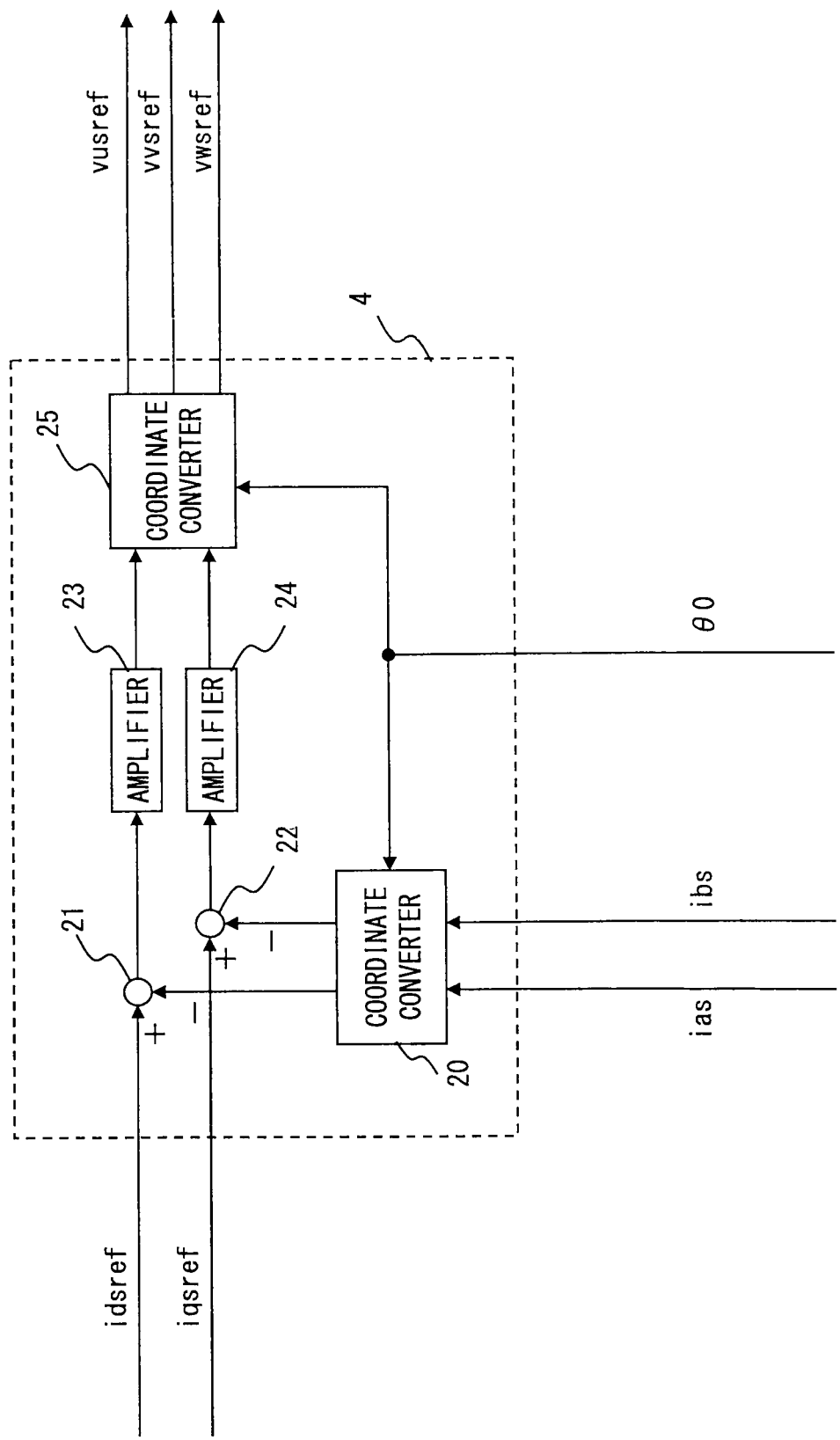
FIG. 3 is a diagram showing an internal configuration of AC rotary machine control means 4 in FIG. 1.

FIG. 3 is a diagram showing an internal configuration of the AC rotary machine control means 4. In FIG. 3, a coordinate converter 20 converts two-phase AC currents on the a-b axis coordinate system outputted by the three-phase/two-phase converter 10 in the current vector detection means 3, into currents on a rotational two-axis coordinate system which rotates synchronously with the estimated magnetic flux phase θ0 outputted by the adaptive observation means 7. Here, the rotational two-axis coordinate system which rotates synchronously with the estimated magnetic flux phase 80 is defined as d-q axes. That is, the coordinate converter 20 outputs an a-axis component ias of the detected current vector and a b-axis component ibs of the detected current vector on the a-b axes, as a d-axis component ids of a detected current vector and a q-axis component iqs of the detected current vector on the d-q axes, based on the estimated magnetic flux phase 80 outputted by the adaptive observation means 7.

A subtractor 21 subtracts the d-axis component ids of the detected current vector from a d-axis component idsref of the current instruction vector, and a subtractor 22 subtracts the q-axis component iqs of the detected current vector from a q-axis component iqsref of the current instruction vector.

An amplifier 23 amplifies a deviation between the d-axis component idsref of the current instruction vector obtained from the subtractor 21 and the d-axis component ids of the detected current vector by a proportional integral calculation, and outputs the resultant value as a d-axis component vdsref of the voltage instruction vector. An amplifier 24 amplifies a deviation between the q-axis component iqsref of the current instruction vector obtained from the subtractor 22 and the q-axis component iqs of the detected current vector by a proportional integral calculation, and outputs the resultant value as a q-axis component vqsref of the voltage instruction vector.

A coordinate converter 25 performs coordinate conversion of the two-phase voltage instructions on the d-q axis coordinate system outputted by the amplifiers 23 and 24, to obtain three-phase AC voltage instructions, based on the estimated magnetic flux phase θ0 outputted by the adaptive observation means 7, and outputs a U phase component, a V phase component, and a W phase component of the voltage instruction vector Vsref.

Figure 4:
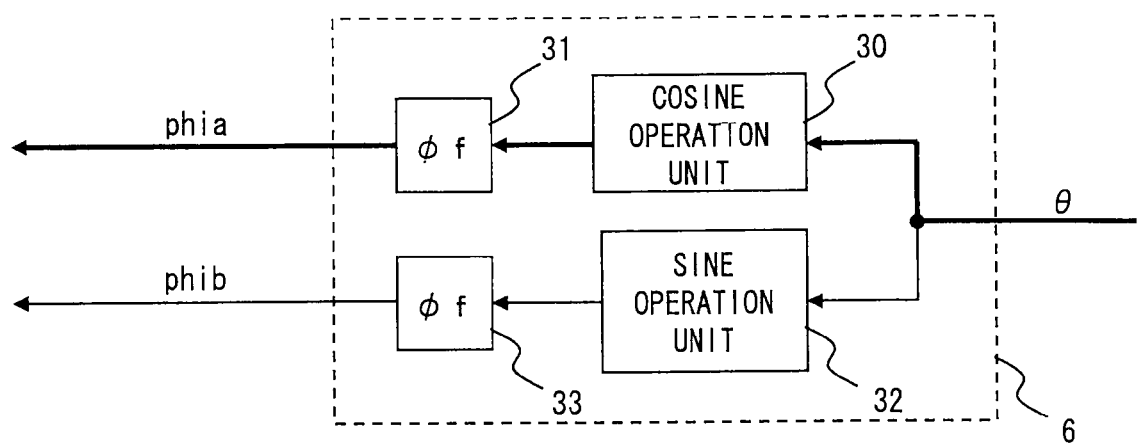
FIG. 4 is a diagram showing an internal configuration of magnetic flux vector detection means 6 in FIG. 1.

FIG. 4 is a diagram showing an internal configuration of the magnetic flux vector detection means 6. In FIG. 4, a cosine operation unit 30 performs a cosine operation in accordance with a rotational angle θ obtained from the rotational position detection means 5, and outputs cos θ. A gain calculation unit 31 outputs a value obtained by proportionating cos θ outputted by the cosine operation unit 30 by a preset value, as an a-axis component phia of the detected magnetic flux vector. The proportionality coefficient of the gain calculation unit 31 is given as a rotor magnetic flux amplitude □f.

A sine operation unit 32 performs a sine operation in accordance with the rotational angle θ obtained from the rotational position detection means 5, and outputs sin θ. A gain calculation unit 33 outputs a value obtained by proportionating sin θ outputted by the sine operation unit 32 by a preset value, as ab-axis component phib of the detected magnetic flux vector. The proportionality coefficient of the gain calculation unit 33 is also given as the rotor magnetic flux amplitude □f as in the case of the gain calculation unit 31.

Figure 5:
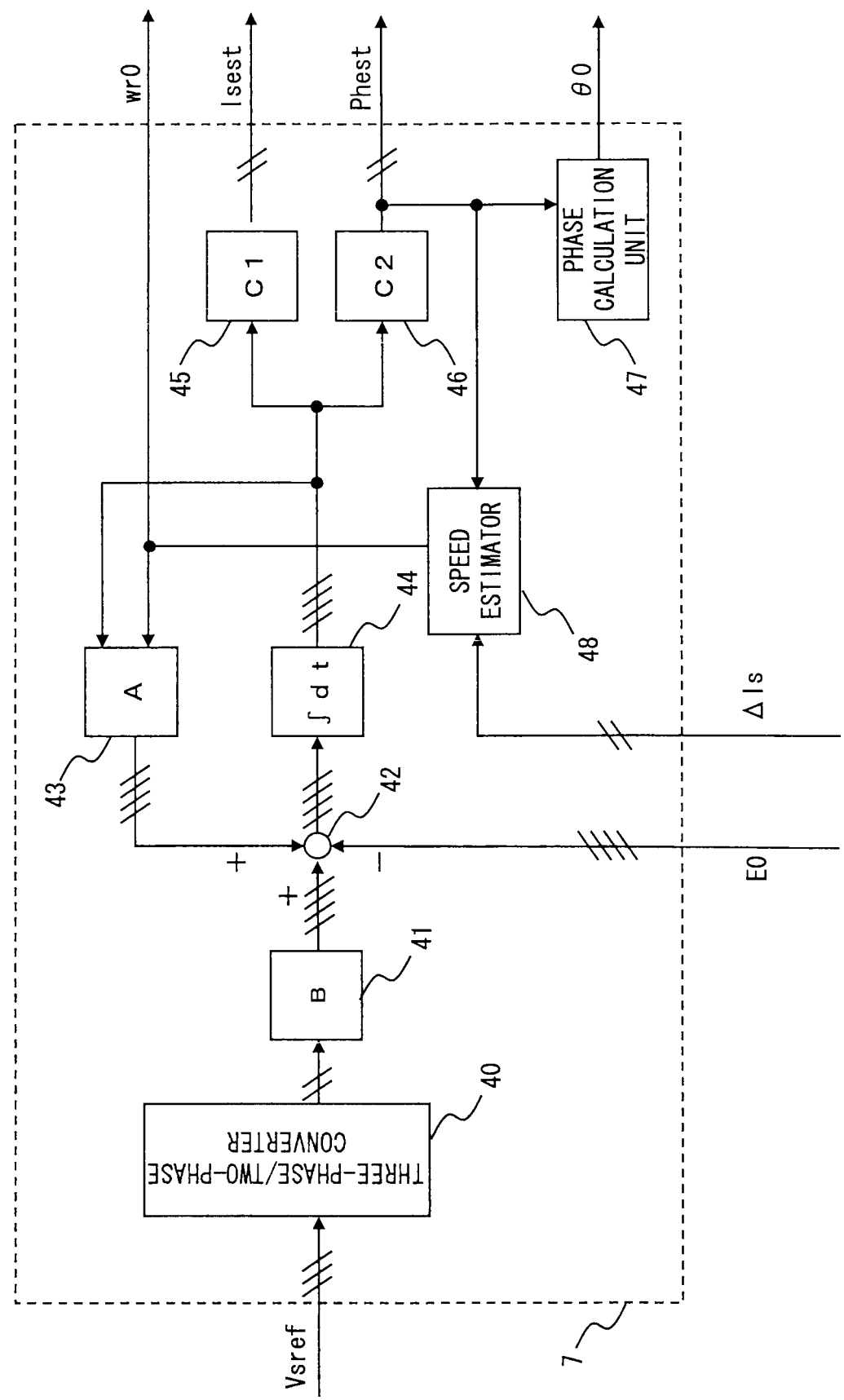
FIG. 5 is a diagram showing an internal configuration of adaptive observation means 7 in FIG. 1.

FIG. 5 is a diagram showing an internal configuration of the adaptive observation means 7. Before FIG. 5 is described, the basis for calculation performed in the adaptive observation means 7 will be described. An armature resistance of the AC rotary machine 2 is defined as R, an armature inductance is defined as L, and an estimated speed is defined as wr0, and matrices A, B, C1, and C2 are defined by expression (1).

[Expression 1]

$$A = \begin{pmatrix} -\frac{R}{L} & 0 & 0 & wr0 \\ 0 & -\frac{R}{L} & -wr0 & 0 \\ 0 & 0 & 0 & -wr0 \\ 0 & 0 & wr0 & 0 \end{pmatrix}, \quad (1)$$

$$B = \begin{pmatrix} 1 & 0 \\ 0 & 1 \\ 0 & 0 \\ 0 & 0 \end{pmatrix},$$

$$C1 = \begin{pmatrix} \frac{1}{L} & 0 & 0 & 0 \\ 0 & \frac{1}{L} & 0 & 0 \end{pmatrix},$$

$$C2 = \begin{pmatrix} 0 & 0 & 1 & 0 \\ 0 & 0 & 0 & 1 \end{pmatrix}$$

An a-axis component of an estimated current vector on the a-b axes is defined as ias0, a b-axis component of the estimated current vector on the a-b axes is defined as ibs0, an a-axis component of an estimated armature reaction vector on the a-b axes is defined as pas0, a b-axis component of the estimated armature reaction vector on the a-b-axes is defined as pbs0, an a-axis component of an estimated magnetic flux vector on the a-b axes is defined as par0, a b-axis component of the estimated magnetic flux vector on the a-b axes is defined as pbr0, an a-axis component of a voltage instruction vector on the a-b axes is defined as vas*, and a b-axis component of the voltage instruction vector on the a-b axes is defined as vbs*. Moreover, an amplified deviation vector is defined as $(e1, e2, e3, e4)^T$. The symbol $^T$ denotes a transposed matrix.

If the voltage instruction vector vas* and vbs* on the a-b axes and the amplified deviation vector $(e1, e2, e3, e4)^T$ are given, pas0, pbs0, par0, and pbr0 can be obtained by expression (2).

[Expression 2]

$$\frac{d}{dt}\begin{pmatrix} pas0 \\ pbs0 \\ par0 \\ pbr0 \end{pmatrix} = A\begin{pmatrix} pas0 \\ pbs0 \\ par0 \\ pbr0 \end{pmatrix} + B\begin{pmatrix} vas^* \\ vbs^* \end{pmatrix} - \begin{pmatrix} e1 \\ e2 \\ e3 \\ e4 \end{pmatrix} \quad (2)$$

Further, an a-axis component of a current deviation vector on the a-b axes is defined as ea, a b-axis component of the current deviation vector on the a-b axes is defined as eb, s is defined as a Laplace operator (differential operator), kp is defined as a proportional gain, and ki is defined as an integration gain. The estimated speed wr0, which is an internal parameter of matrix A in expression (2), is given by expression (3).

[Expression 3]

$$wr0 = \left(kp + \frac{ki}{s}\right)(eapbr0 - ebpar0) \quad (3)$$

Further, if pas0, pbs0, par0, and pbr0 are given, ias0 and ibs0 can be obtained by expression (4).

[Expression 4]

$$\begin{pmatrix} ias0 \\ ibs0 \end{pmatrix} = C1\begin{pmatrix} pas0 \\ pbs0 \\ par0 \\ pbr0 \end{pmatrix} \quad (4)$$

Similarly, if pas0, pbs0, par0, and pbr0 are given, par0 and pbr0 can be obtained by expression (5).

[Expression 5]

$$\begin{pmatrix} par0 \\ pbr0 \end{pmatrix} = C2\begin{pmatrix} pas0 \\ pbs0 \\ par0 \\ pbr0 \end{pmatrix} \quad (5)$$

Further, sgn is defined as a sign function that outputs 1 for a positive number and $-1$ for a negative number, the estimated magnetic flux phase $\theta 0$ can be obtained by expression (6).

[Expression 6]

$$\theta 0 = \tan^{-1}\left(\frac{pbr0}{par0}\right) + \pi\left(\frac{1 - \text{sgn}(par0)}{2}\right) \quad (6)$$

As described above, if expressions (1) to (6) are used, the estimated speed wr0, the estimated current vector Isest, the estimated magnetic flux vector Phest, and the estimated magnetic flux phase $\theta 0$ can be calculated, based on the voltage instruction vector Vsref, the amplified deviation vector E0, and the current deviation vector $\Delta$Is.

Based on this, FIG. 5 showing an internal configuration of the adaptive observation means 7 will be described. In FIG. 5, a three-phase/two-phase converter 40 converts the voltage instruction vector Vsref of three-phase AC currents into a voltage instruction vector Vsref of two-phase AC currents, and outputs a voltage instruction vector vas* and vbs* on the a-b axes. A gain-matrix calculation unit 41 outputs a result obtained by multiplying matrix B by the vector $(vas^*, vbs^*)^T$. An adder-subtractor 42 performs, in accordance with the signs indicated in the drawing, addition and subtraction with respect to the output from the gain-matrix calculation unit 41, the output from a gain-matrix calculation unit 43, and the amplified deviation vector $(e1, e2, e3, e4)^T$, and outputs a resulting vector. An integrator 44 performs integration for each component of the vector outputted by the adder-subtractor 42, and outputs the result as a vector $(pas0, pbs0, par0, pbr0)^T$. The gain-matrix calculation unit 43 obtains matrix A defined in expression (1) based on the estimated speed wr0, and outputs a result obtained by multiplying matrix A by the vector $(pas0, pbs0, par0, pbr0)^T$. Through this series of calculations, the input to the integrator 44 corresponds to the right side of expression (2).

Moreover, the left side of expression (2) is a differentiation of the vector $(pas0, pbs0, par0, pbr0)^T$, and also is the input to the integrator 44. Therefore, the output from the integrator 44 is the vector $(pas0, pbs0, par0, pbr0)^T$. A gain matrix 45 performs the matrix calculation of expression (4), and outputs an estimated current vector Iaset $(ias0, ibs0)^T$. A gain matrix 46 performs the matrix calculation of expression (5), and outputs the estimated magnetic flux vector Phest $(par0, pbr0)^T$. A phase calculation unit 47 performs the calculation of expression (6) based on the inputted estimated magnetic flux vector $(par0, pbr0)^T$, and outputs the estimated magnetic flux phase $\theta 0$. A speed estimator 48 performs the calculation of expression (3) based on the inputted estimated magnetic flux vector $(par0, pbr0)^T$ and the current deviation vector $(ea, eb)^T$, and outputs the estimated speed wr0.

Figure 6:
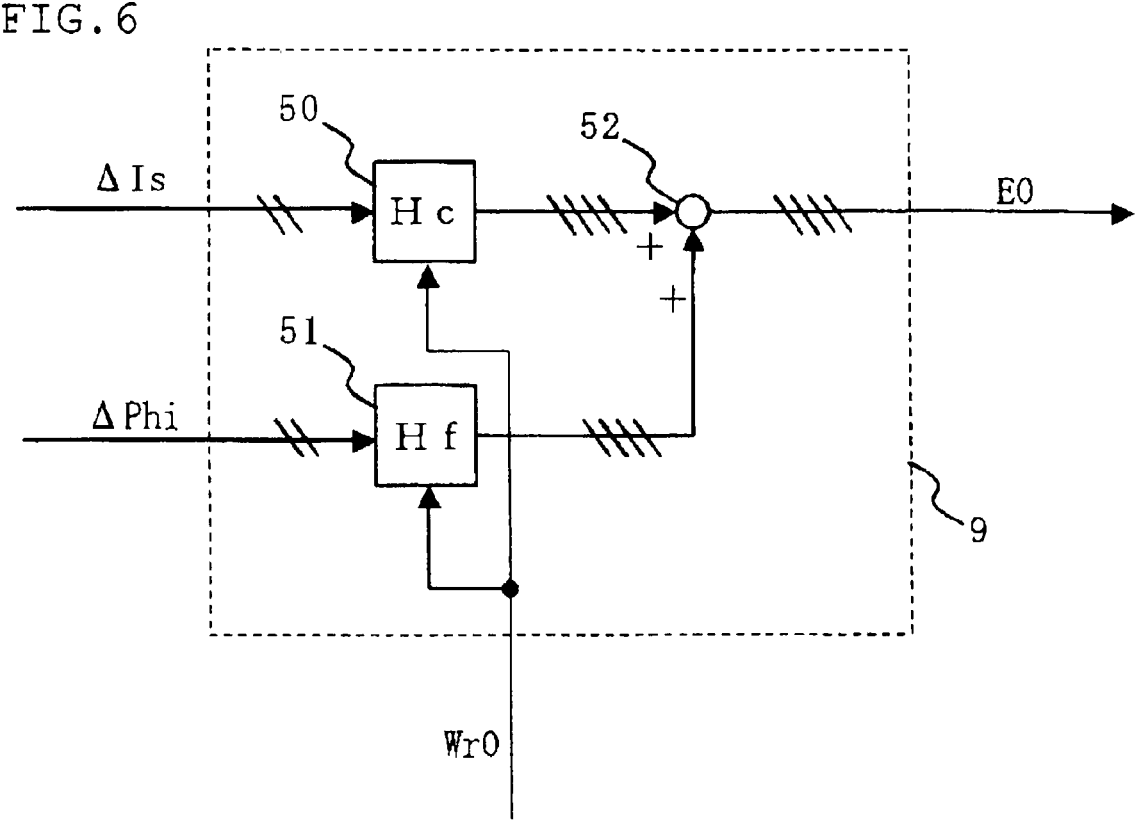
FIG. 6 is a diagram showing an internal configuration of deviation amplifying means 9 in FIG. 1.

FIG. 6 is a diagram showing an internal configuration of the deviation amplifying means 9. An a-axis component of the magnetic flux deviation vector on the a-b axes is defined as epa, a b-axis component of the magnetic flux deviation vector on the a-b axes is defined as epb. In FIG. 6, a gain matrix 50 outputs a result obtained by multiplying the current deviation vector $(ea, eb)^T$ by matrix Hc, and a gain matrix 51 outputs a result obtained by multiplying the magnetic flux deviation vector $(epa, epb)^T$ by matrix Hf. Here, Hc and Hf are gain matrices defined by expression (7), and h11 to h44 in expression (7) are amplification gains.

[Expression 7]

$$Hc = \begin{pmatrix} h_{11} & h_{12} \\ h_{21} & h_{22} \\ h_{31} & h_{32} \\ h_{41} & h_{42} \end{pmatrix}, Hf = \begin{pmatrix} h_{13} & h_{14} \\ h_{23} & h_{24} \\ h_{33} & h_{34} \\ h_{43} & h_{44} \end{pmatrix} \quad (7)$$

An adder 52 adds an output vector $(ec1, ec2, ec3, ec4)^T$ from the gain matrix 50 and an output vector $(ep1, ep2, ep3, ep4)^T$ from the gain matrix 51, and outputs (ec1+ep1, ec2+ ep2, ec3+ep3, ec4+ep4)$^T$ as an amplified deviation vector (e1, e2, e3, e4)$^T$. As described below, in the gain matrix 51, in particular, in a case where the absolute value of the estimated speed is large, if the values of h13, h14, h23, h24, h33, h34, h43, and h44 are made to be zero, then the output of the gain matrix 51 can be made to be zero in a high-rotation region.

Therefore, even when the detected magnetic flux vector Phi is determined based on an output from the rotational position detection means 5 which generally does not have good response characteristics, it is possible to prevent reduction of the drive characteristics in a high-rotation region resulting from the poor responsiveness.

Figure 7:
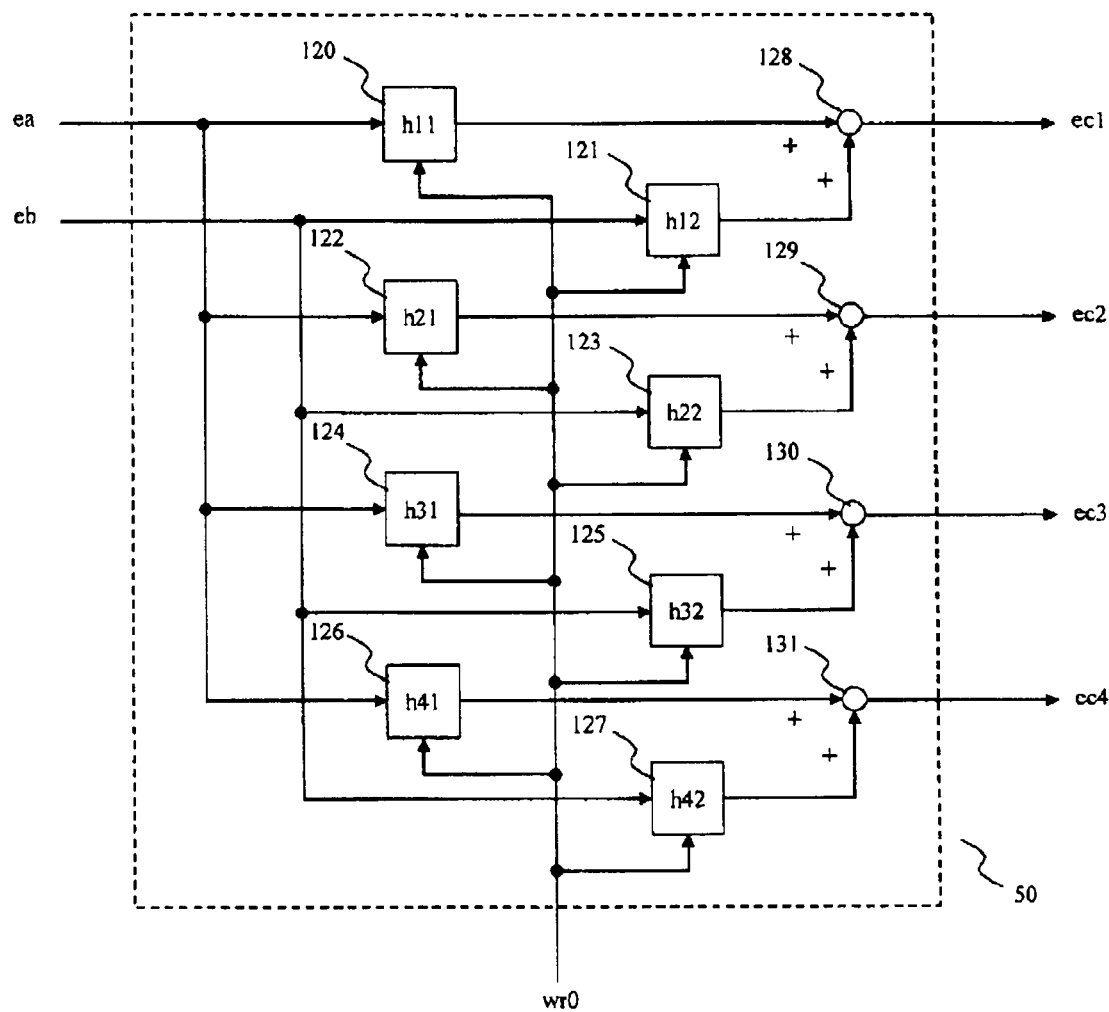
FIG. 7 is a diagram showing an internal configuration of a gain matrix 50 in FIG. 6.

FIG. 7 is a diagram showing an internal configuration of the gain matrix 50. In FIG. 7, an amplification gain 120 multiplies the gain h11 based on the estimated speed wr0 and the a-axis component ea of the current deviation vector on the a-b axes, and outputs the result. An amplification gain 121 multiplies the gain h12 based on the estimated speed wr0 and the b-axis component eb of the current deviation vector on the a-b axes, and outputs the result. Similarly, an amplification gain 122 multiplies the gain h21 based on the estimated speed wr0 and the a-axis component ea of the current deviation vector on the a-b axes, and outputs the result. An amplification gain 123 multiplies the gain h22 based on the estimated speed wr0 and the b-axis component eb of the current deviation vector on the a-b axes, and outputs the result. Similarly, an amplification gain 124 multiplies the gain h31 based on the estimated speed wr0 and the a-axis component ea of the current deviation vector on the a-b axes, and outputs the result. An amplification gain 125 multiplies the gain h32 based on the estimated speed wr0 and the b-axis component eb of the current deviation vector on the a-b axes, and outputs the result. Similarly, an amplification gain 126 multiplies the gain h41 based on the estimated speed wr0 and the a-axis component ea of the current deviation vector on the a-b axes, and outputs the result. An amplification gain 127 multiplies the gain h42 based on the estimated speed wr0 and the b-axis component eb of the current deviation vector on the a-b axes, and outputs the result.

Then, an adder 128 adds the output from the amplification gain 120 and the output from the amplification gain 121, and outputs the result as an amplified deviation ec1. Similarly, an adder 129 adds the output from the amplification gain 122 and the output from the amplification gain 123, and outputs the result as an amplified deviation ec2. Similarly, an adder 130 adds the output from the amplification gain 124 and the output from the amplification gain 125, and outputs the result as an amplified deviation ec3. Similarly, an adder 131 adds the output from the amplification gain 126 and the output from the amplification gain 127, and outputs the result as an amplified deviation ec4.

Figure 8:
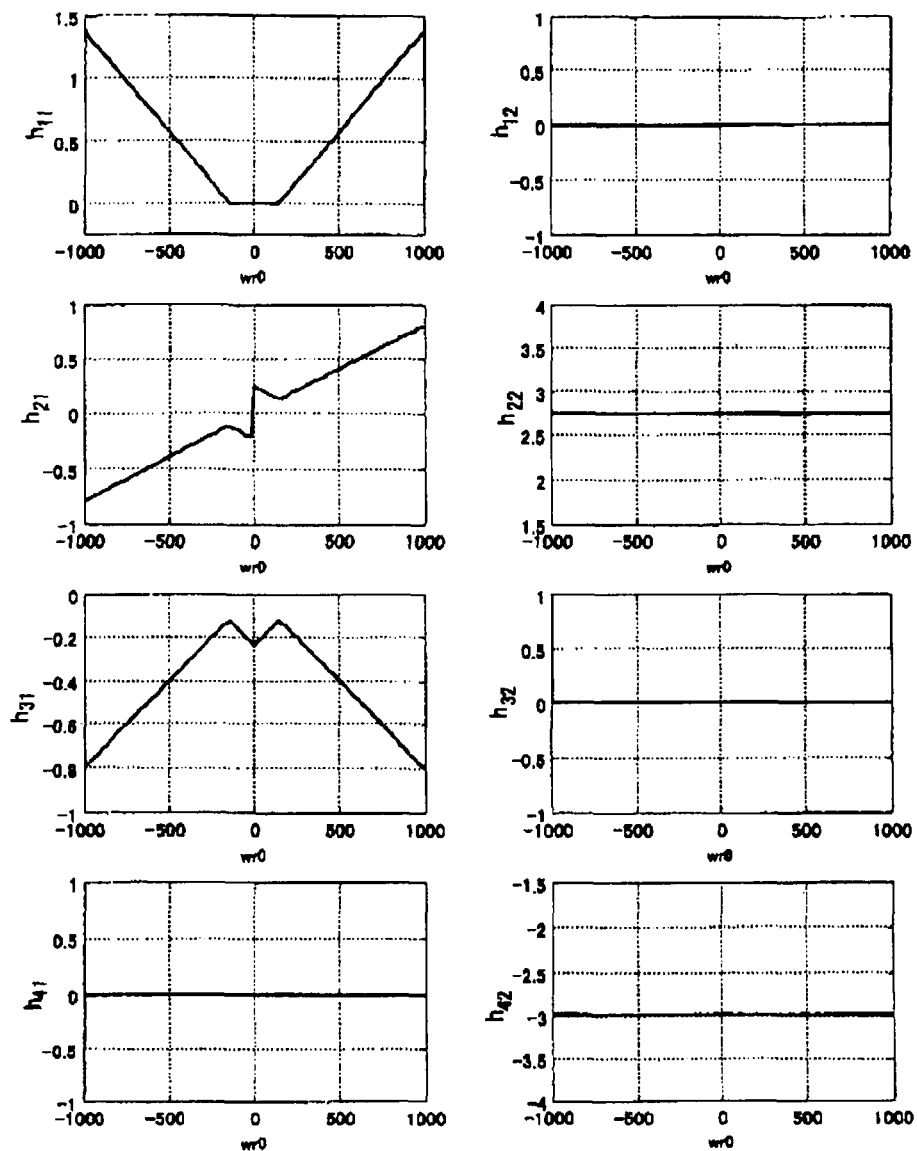
FIG. 8 is a diagram showing a relationship between each gain in the gain matrix 50 and an estimated speed wr0.

FIG. 8 shows a relationship between the estimated speed wr0 and each of the amplification gains h11, h12, h21, h22, h31, h32, h41, and h42 in the present embodiment 1. In this example, since h12, h32, and h41 are set at 0 irrespective of the estimated speed wr0, the amplification gains 121, 125, and 126 in FIG. 7 may be omitted.

Since the bases for setting the characteristics of not only the amplification gains 121, 125, and 126 but also the other amplification gains used in the example above are not particularly important in the present invention, detailed description thereof will be omitted.

By using the amplification gains h11, h12, h21, h22, h31, h32, h41, and h42 shown in FIG. 8, in a case where a deviation has occurred between the estimated speed wr0 and the rotational speed of the AC rotary machine 2, a current deviation can be generated in a component orthogonal to the estimated magnetic flux. Accordingly, when the calculation of expression (3) is performed by the speed estimator 48, the estimated speed wr0 can be outputted stably.

Figure 9:
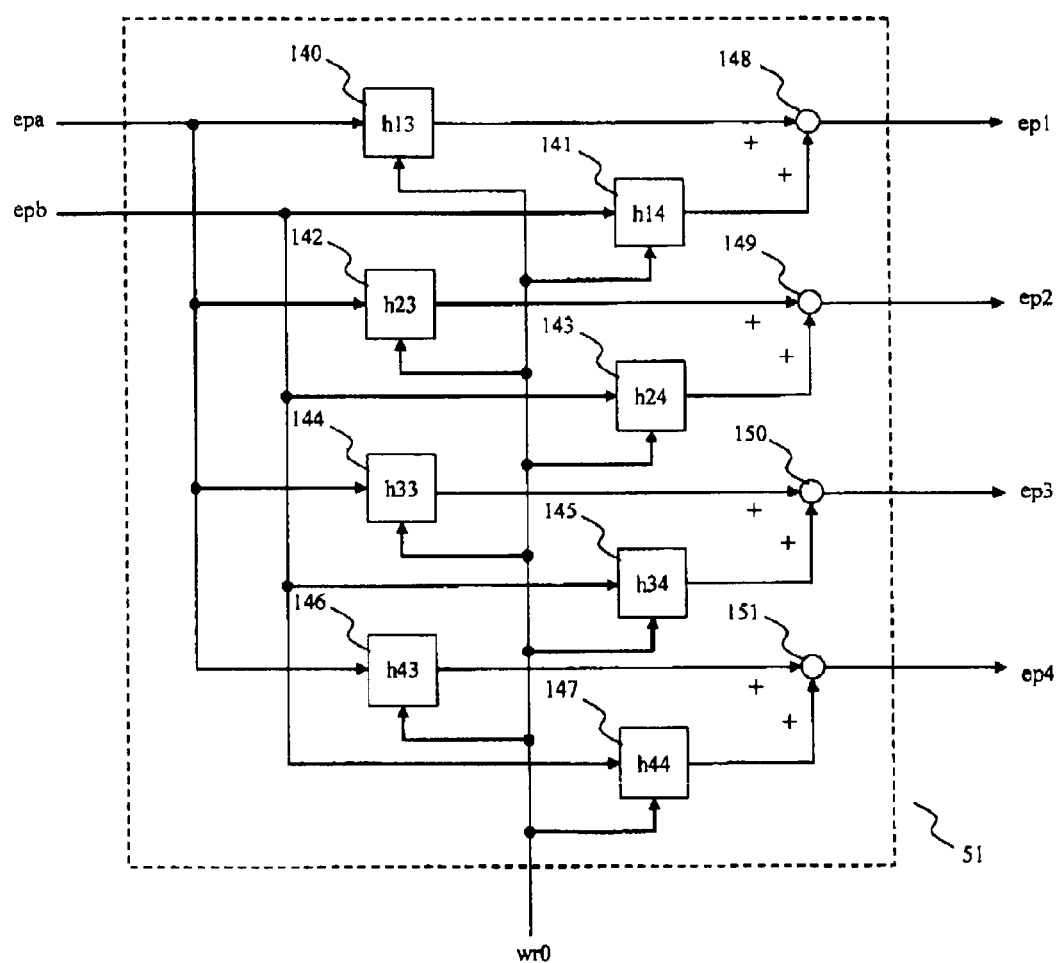
FIG. 9 is a diagram showing an internal configuration of a gain matrix 51 in FIG. 6.

FIG. 9 is a diagram showing an internal configuration of the gain matrix 51. In FIG. 9, an amplification gain 140 multiplies the gain h13 based on the estimated speed wr0 and the a-axis component epa of the magnetic flux deviation vector on the a-b axes, and outputs the result. An amplification gain 141 multiplies the gain h14 based on the estimated speed wr0 and the b-axis component epb of the magnetic flux deviation vector on the a-b axes, and outputs the result. Similarly, an amplification gain 142 multiplies the gain h23 based on the estimated speed wr0 and the a-axis component epa of the magnetic flux deviation vector on the a-b axes, and outputs the result. An amplification gain 143 multiplies the gain h24 based on the estimated speed wr0 and the b-axis component epb of the magnetic flux deviation vector on the a-b axes, and outputs the result. Similarly, an amplification gain 144 multiplies the gain h33 based on the estimated speed wr0 and the a-axis component epa of the magnetic flux deviation vector on the a-b axes, and outputs the result. An amplification gain 145 multiplies the gain h34 based on the estimated speed wr0 and the b-axis component epb of the magnetic flux deviation vector on the a-b axes, and outputs the result. Similarly, an amplification gain 146 multiplies the gain h43 based on the estimated speed wr0 and the a-axis component epa of the magnetic flux deviation vector on the a-b axes, and outputs the result. An amplification gain 147 multiplies the gain h44 based on the estimated speed wr0 and the b-axis component epb of the magnetic flux deviation vector on the a-b axes, and outputs the result.

Then, an adder 148 adds the output from the amplification gain 140 and the output from the amplification gain 141, and outputs the result as an amplified deviation ep1. Similarly, an adder 149 adds the output from the amplification gain 142 and the output from the amplification gain 143, and outputs the result as an amplified deviation ep2. Similarly, an adder 150 adds the output from the amplification gain 144 and the output from the amplification gain 145, and outputs the result as an amplified deviation ep3. Similarly, an adder 151 adds the output from the amplification gain 146 and the output from the amplification gain 147, and outputs the result as an amplified deviation ep4.

Figure 10:
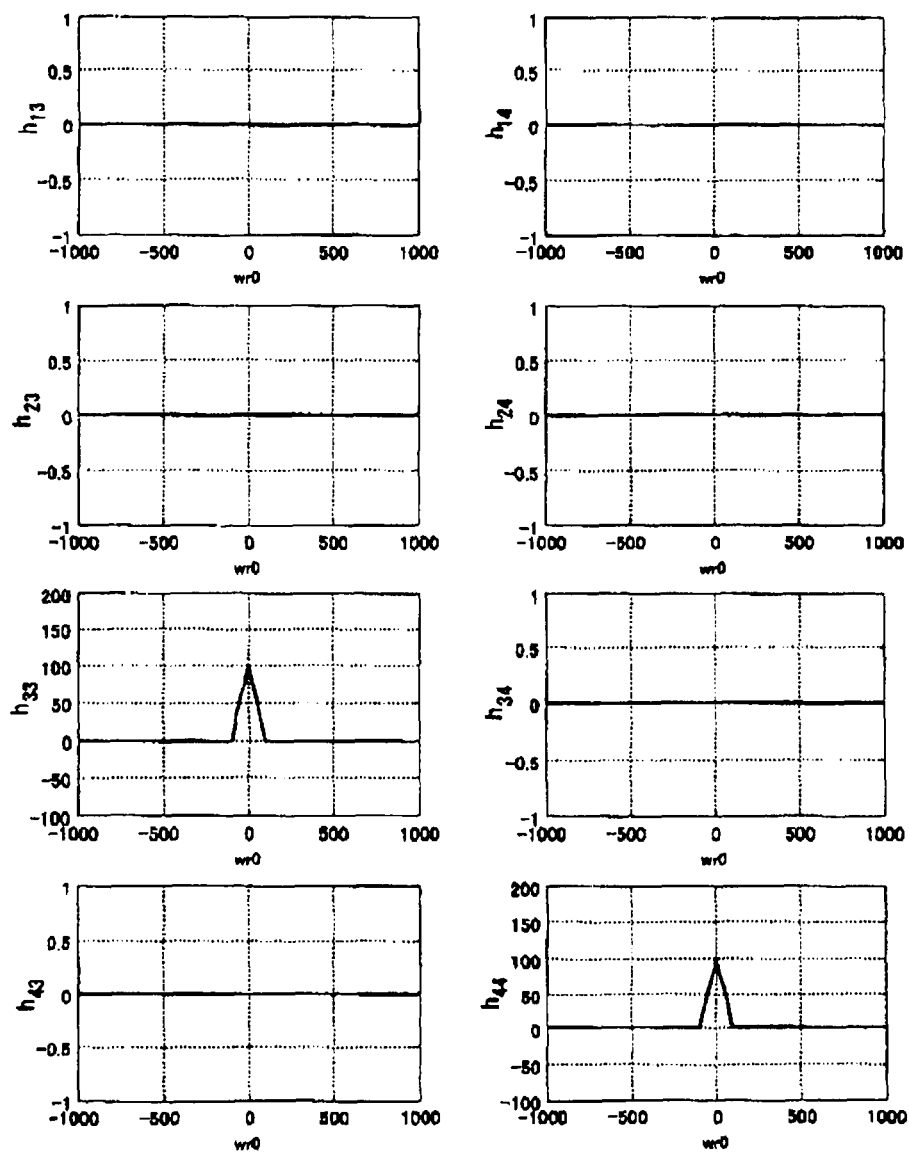
FIG. 10 is a diagram, showing a relationship between each gain in the gain matrix 51 and the estimated speed wr0.

FIG. 10 shows a relationship between the estimated speed wr0 and each of the amplification gains h13, h14, h23, h24, h33, h34, h43, and h44 in the present embodiment 1. In the case of the present embodiment 1, the amplification gains other than the amplification gains h33 and h44 are 0 irrespective of the estimated speed wr0. Therefore, the amplification gains 140, 141, 142, 143, 145, and 146 in FIG. 9 may be omitted.

As described above, with respect to the current deviation vector, by using the amplification gains h11, h12, h21, h22, h31, h32, h41, and h42, in a case where a deviation has occurred between the estimated speed wr0 and the rotational speed of the AC rotary machine 2, a current deviation vector can be generated in a component orthogonal to the estimated magnetic flux.

Meanwhile, in a case where the AC rotary machine 2 is stopped and the voltage application means 1 is applying a DC voltage to the AC rotary machine 2, the AC rotary machine 2 is merely equivalent to a resistance circuit. In other words, in a case where the AC rotary machine 2 is stopped and the voltage application means 1 is applying a DC voltage, the impedance of the AC rotary machine 2 is not relevant to the rotational speed. Therefore, irrespective of the presence or absence of a deviation between the estimated speed wr0 and the rotational speed of the AC rotary machine 2, the current deviation vector ΔIs is not generated. However, with respect to the magnetic flux deviation vector ΔPhi, even when the AC rotary machine 2 is stopped, the value of the detected magnetic flux vector Phi is not relevant to the impedance of the AC rotary machine 2, and the value of the detected magnetic flux vector Phi varies and is determined depending on the rotational angle even while the AC rotary machine 2 is stopped. Therefore, unless the estimated magnetic flux vector Phest coincides with the detected magnetic flux vector Phi, the magnetic flux deviation vector ΔPhi will be generated.

Using this, as shown in FIG. 10, the amplification gains h33 and h44 are set to have a predetermined magnitude in a region where the estimated speed wr0 is small, whereby the deviation amplifying means 9 outputs the amplified deviation vector E0 such that the estimated magnetic flux vector Phest coincides with the detected magnetic flux vector Phi.

The values of h33 and h44 may be varied in a stepwise manner, in accordance with the estimated speed wr0. However, for smoother operation, the values may be linearly varied as shown in FIG. 10.

For example, even in a case where inexpensive rotational position detection means 5 is used whose reliability is reduced due to its low responsiveness when the rotational speed is increased, if the amplification gains h33 and h44 are set to have a predetermined magnitude at a low speed range where the reliability can be maintained, and if the amplification gains h33 and h44 are set to zero in the other speed ranges, the magnetic flux deviation vector ΔPhi will not be generated.

As described above, when the AC rotary machine 2 is stopped and the voltage application means 1 is applying a DC voltage to the AC rotary machine 2, a current deviation is not generated. In the other ranges, the adaptive observation means 7 performs fundamentally the same operations, for example, as the exemplary controller for an AC rotary machine of Patent Literature 3, and performs smooth controlling operations. When the AC rotary machine 2 is not stopped, even if the magnetic flux deviation vector ΔPhi is made to be zero, the adaptive observation means 7 stably operates based on the current deviation vector ΔIs. Further, when the AC rotary machine 2 is stopped, even if the current deviation vector ΔIs is not generated due to the fact that the impedance of the AC rotary machine is equivalent to the resistance circuit, the adaptive observation means 7 will operate stably by the magnetic flux deviation vector ΔPhi being generated.

That is, even if the accuracy in position detection of the rotational position detection means 5 is reduced in a high-rotation region, the adaptive observation means 7 will calculate the estimated magnetic flux phase θ0 without using the detected magnetic flux vector Phi, and thus, it is possible to stably drive the AC rotary machine 2 even in a high-rotation region, which is an effect.

The above description has been given on an assumption that the AC rotary machine is in a stopped state. However, in a low rotation speed region including a stop, a current deviation will scarcely occur, and the rotational position detection means has sufficient detection accuracy up to a certain rotational speed region. Therefore, in consideration of these, the amplification gains h33 and h44 of the gain matrix 51 are not limited to the characteristics shown in FIG. 10. The same effect as described above can be obtained by setting the amplification gains h33 and h44 at values that are smaller at a time when the estimated speed wr0 is high, than those at a time when the estimated speed wr0 is low.

Further, it is not impossible that the amplification gains set in the deviation amplifying means 9 are set to constant values irrespective of the speed, depending on the characteristics of the rotational position detection means 5 and the drive characteristics required by the AC rotary machine. In this case, it is not necessary to provide the deviation amplifying means 9, and the output from the deviation vector calculation means 8 will be outputted to the adaptive observation means 7 as the amplified deviation vector E0.

Also in this configuration, the adaptive observation means 7 none the less calculates the estimated magnetic flux phase such that at least the deviation between the estimated magnetic flux vector and the detected magnetic flux vector becomes small. Therefore, it is possible obtain an effect in which: a smooth drive can be attained from a low-speed region including zero speed to a high-speed region, and even if an initial value error is present in the estimated phase, the error is promptly converged and desired characteristics can be obtained.

As described above, the present embodiment 1 has a configuration in which the adaptive observation means 7 calculates an estimated magnetic flux phase based on the current deviation vector and the amplified deviation vector such that the deviation between the estimated current vector and the detected current vector and the deviation between the estimated magnetic flux vector and the detected magnetic flux vector become small; the AC rotary machine control means 4 calculates a voltage instruction vector based on the estimated magnetic flux phase; and the voltage application means 1 applies a voltage to the AC rotary machine 2 based on the voltage instruction vector. Accordingly, even in a case where the phase difference between the estimated magnetic flux vector and the detected magnetic flux vector exceeds 90 degrees due to an initial value error or a disturbance, or the phase difference is small, it is possible to maintain the error convergence characteristic and the responsiveness of the position estimation. Accordingly, the calculation of the estimated magnetic flux phase is reliably performed via a magnetic flux deviation vector that will be assuredly generated in a low-speed state including a stop state of the AC rotary machine. In addition, the amplification gains which amplify the magnetic flux deviation vector at the deviation amplifying means 9 are set to be small in regions other than the low-speed region including a stop. Accordingly, even if the response of the rotational position detection by the rotational position detection means 5 is slow, a stable and smooth drive of the AC rotary machine can be attained from a low-speed region to a high-speed region.

Embodiment 2

In the controller for the AC rotary machine in embodiment 1, the magnetic flux vector detection means 6 outputs the detected magnetic flux vector Phi based on the rotational position detected by the rotational position detection means 5. However, in a case where rotational position dependence, which is known as saliency, of the inductance is present in the AC rotary machine 2, magnetic flux vector detection means 6a may output the detected magnetic flux vector Phi based on a high-frequency current vector Ish obtained from current vector detection means 3a.

Figure 11:
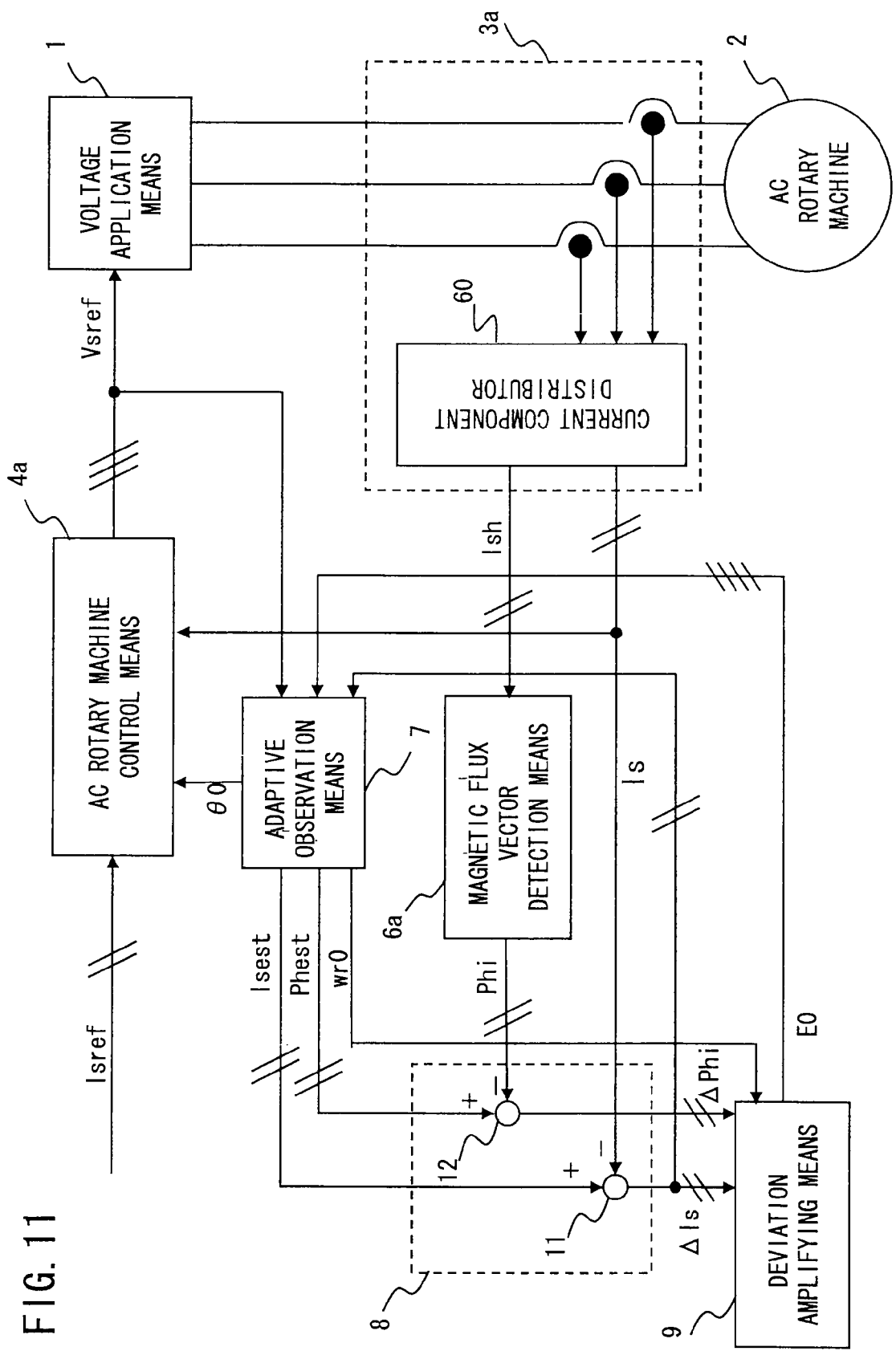
FIG. 11 is a diagram showing an entire configuration of a controller for an AC rotary machine according to embodiment 2 of the present invention.

FIG. 11 is a diagram showing a configuration of a controller of an AC rotary machine according to the present embodiment 2. In FIG. 11, components denoted by the same reference numerals as those in FIG. 1 are the same as or correspond to those in FIG. 1, and individual description thereof will be omitted.

The current vector detection means 3a includes a current component distributor 60, and detects the detected current vector Is and the high-frequency current vector Ish from the AC rotary machine 2. AC rotary machine control means 4a outputs to the voltage application means 1, based on the estimated magnetic flux phase 80 obtained from the adaptive observation means 7, the voltage instruction vector Vsref that allows a current vector obtained from the current vector detection means 3a to coincide with the current instruction vector Isref and that concurrently allows the high-frequency current vector Ish to be generated. The magnetic flux vector detection means 6a outputs the detected magnetic flux vector Phi based on the high-frequency current vector Ish.

Figure 12:
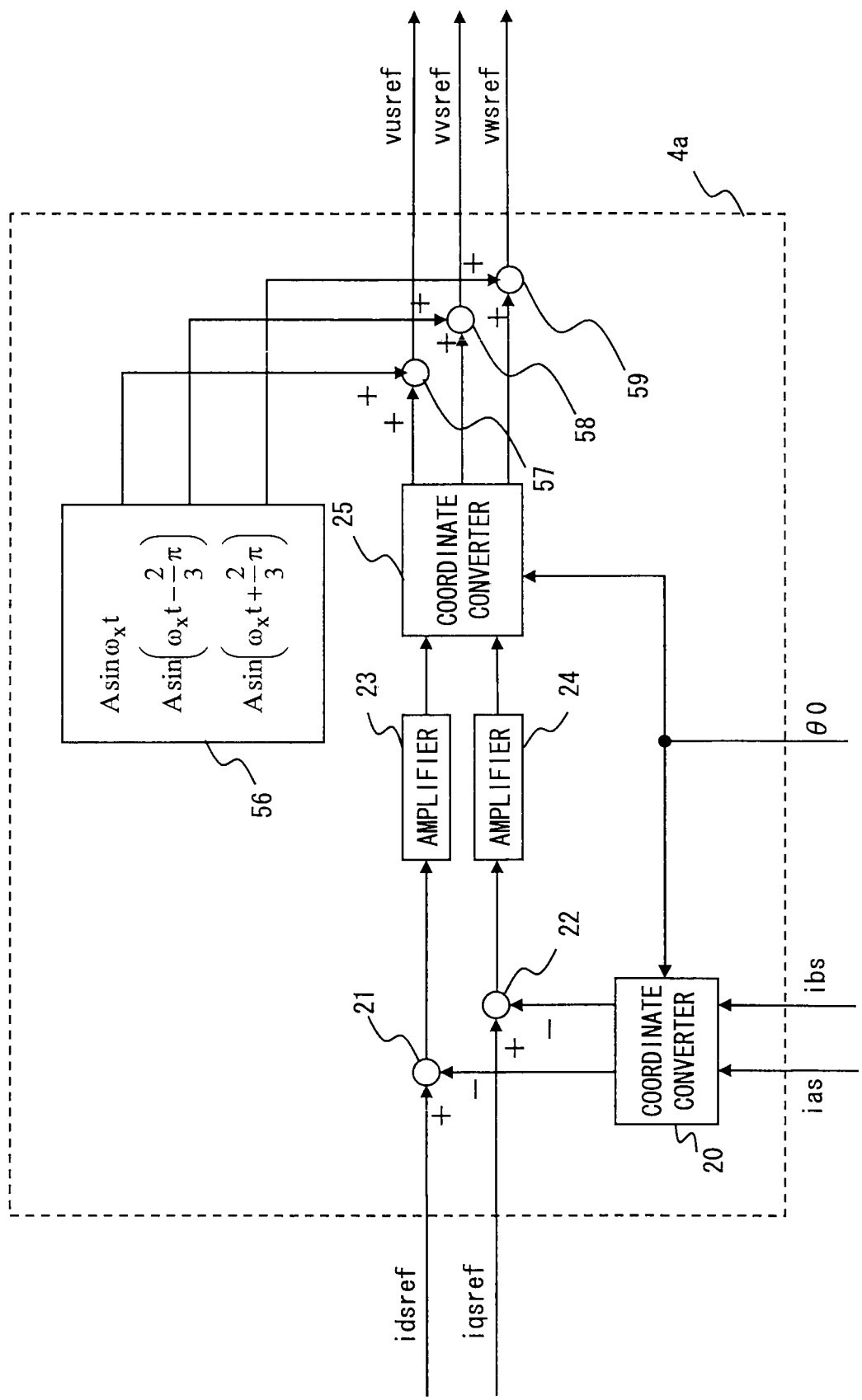
FIG. 12 is a diagram showing an internal configuration of AC rotary machine control means 4a in FIG. 11.

FIG. 12 is a diagram showing an internal configuration of the AC rotary machine control means 4a in the present embodiment 2. Components denoted by the same reference numerals as those in FIG. 3 are the same as or correspond to those in FIG. 3.

A high-frequency voltage instruction vector generator 56 outputs a high-frequency three-phase voltage instruct ion vector Vsref, having a U phase component, a V phase component, and a W phase component, each having an amplitude A, an angular frequency ωx, and a phase difference of $2\pi/3$ [rad] from each other. An adder 57 adds the U phase component of the voltage instruction vector outputted by the high-frequency voltage instruction vector generator 56 to a U phase component of a voltage instruction vector outputted by the coordinate converter 25, and outputs the result as a U phase component of a voltage instruction vector to be given to the voltage application means 1. Similarly, an adder 58 adds the V phase component of the voltage instruction vector outputted by the high-frequency voltage instruction vector generator 56 to a V phase component of the voltage instruction vector outputted by the coordinate converter 25, and outputs the result as a V phase component of the voltage instruction vector to be given to the voltage application means 1. Similarly, an adder 59 adds the W phase component of the voltage instruction vector outputted by the high-frequency voltage instruction vector generator 56 to a W phase component of the voltage instruction vector outputted by the coordinate converter 25, and outputs the result as a W phase component of the voltage instruction vector to be given to the voltage application means 1.

Figure 13:
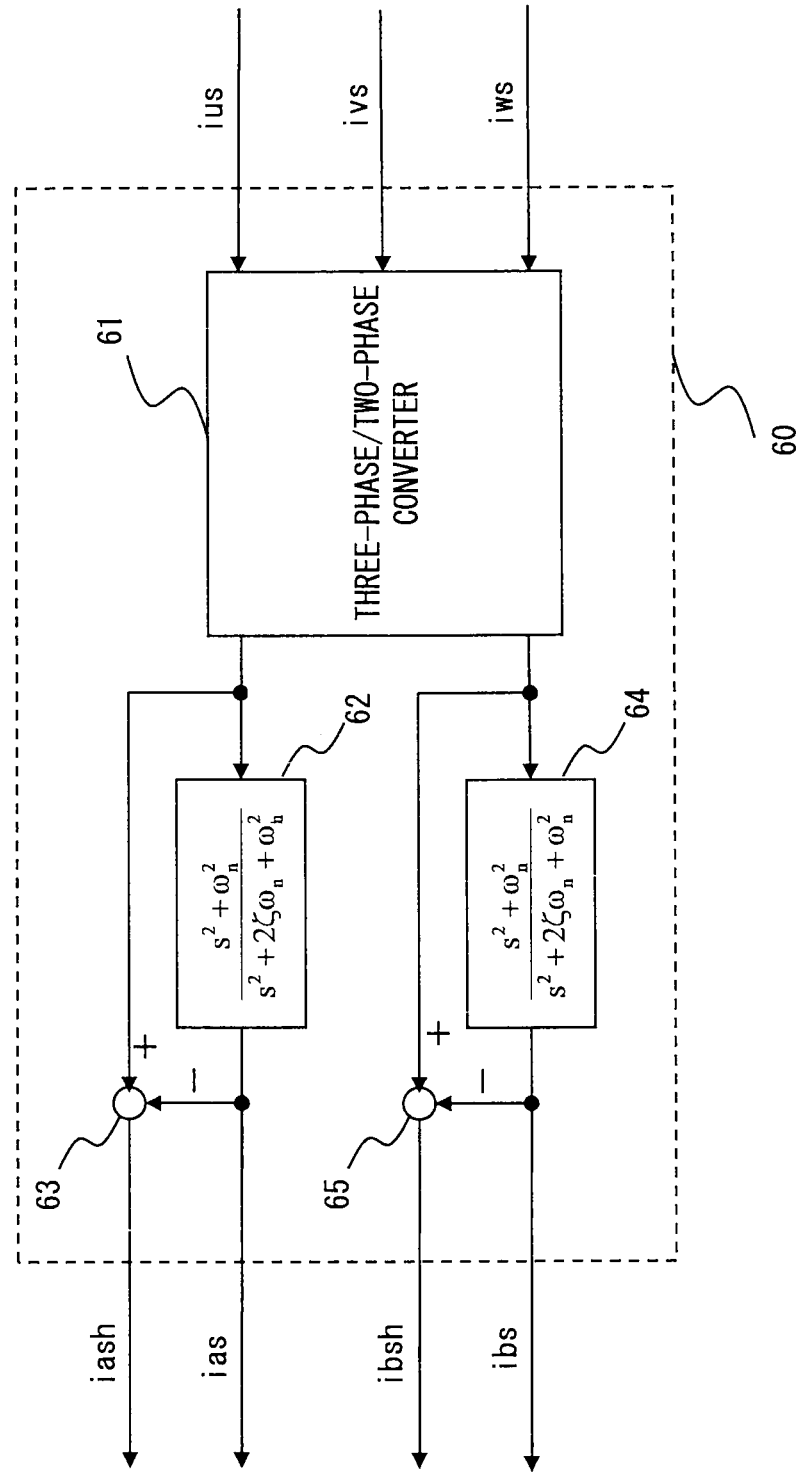
FIG. 13 is a diagram showing an internal configuration of a current component distributor 60 in FIG. 11.

FIG. 13 is a diagram showing an internal configuration of the current component distributor 60 in the present embodiment 2. In FIG. 13, a three-phase/two-phase converter 61 outputs, similarly to the three-phase/two-phase converter 10 according to embodiment 1, a result of conversion of three-phase AC currents into two-phase AC currents, as an a-axis component and a b-axis component of an a-b axis current.

A band stop filter 62 blocks, by using a filter that blocks only the same angular frequency component as the angular frequency ωx [rad/s] of the high-frequency three-phase voltage instruction vector outputted by the high-frequency voltage instruction vector generator 56, the angular frequency ωx [rad/s] component alone from the a-axis component of the current vector outputted by the three-phase/two-phase converter 61, and outputs the result as an a-axis component ias of the detected current vector. A subtractor 63 subtracts the a-axis component ias of the detected current vector outputted by the band stop filter 62 from the a-axis component of the current vector outputted by the three-phase/two-phase converter 61, thereby extracts only the angular frequency ωx [rad/s] component from the a-axis component of the current vector, and outputs the extracted angular frequency as an a-axis component iash of the high-frequency current vector.

Similarly, a band stop filter 64 blocks, by using a filter that blocks only the same angular frequency component as the angular frequency ωx [rad/s] of the high-frequency three-phase voltage instruction vector outputted by the high-frequency voltage instruction vector generator 56, the angular frequency ωx [rad/s] component alone from the b-axis component of the current vector outputted by the three-phase/two-phase converter 61, and outputs the result as a b-axis component ibs of the detected current vector. A subtractor 65 subtracts the b-axis component ibs of the detected current vector outputted by the band stop filter 64 from the b-axis component of the current vector outputted by the three-phase/two-phase converter 61, thereby extracts only the angular frequency ωx [rad/s] component from the b-axis component of the current vector, and outputs the extracted angular frequency as a b-axis component ibsh of the high-frequency current vector.

Figure 14:
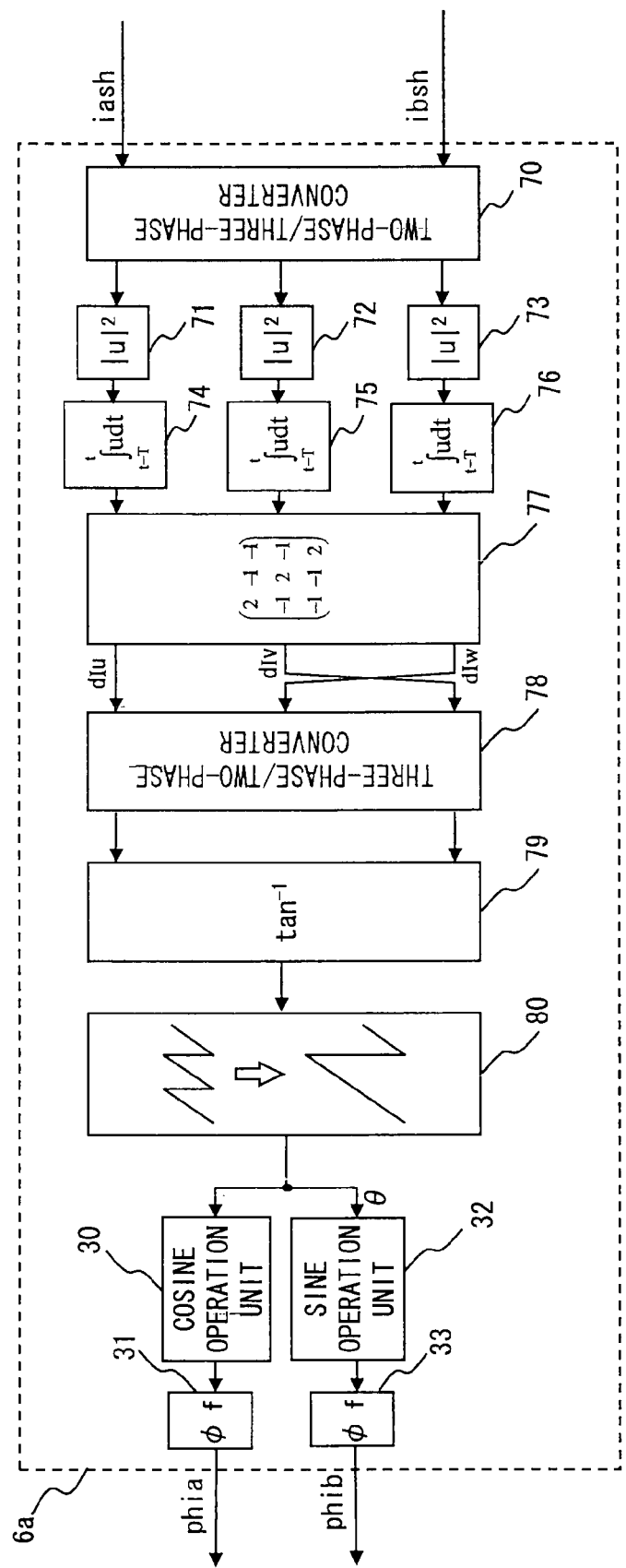
FIG. 14 is a diagram showing an internal configuration of magnetic flux vector detection means 6a in FIG. 11.

FIG. 14 is a diagram showing an internal configuration of the magnetic flux vector detection means 6a. Components denoted by the same reference numerals as those in FIG. 4 are the same as or correspond to those in FIG. 4. A two-phase/three-phase converter 70 performs coordinate conversion of the a-axis component iash and the b-axis component ibsh of the high-frequency current vector obtained from the current component distributor 60 into three-phase AC currents, and outputs a U phase component of the high-frequency current vector, a V phase component of the high-frequency current vector, and a W phase component of the high-frequency current vector. A square calculation unit 71 squares the value of the U phase component of the high-frequency current vector obtained from the two-phase/three-phase converter 70. Similarly, a square calculation unit 72 squares the value of the V phase component of the high-frequency current vector obtained from the two-phase/three-phase converter 70, and a square calculation unit 73 squares the value of the W phase component of the high-frequency current vector obtained from the two-phase/three-phase converter 70.

An integrator 74 integrates the output from the square calculation unit 71. When the current time is defined as t [second], the integrator 74 outputs a result of the integration from the time t−T [second] to the time t second. Here, T is given as a constant. However, if T is given as an integral multiple of $2\pi/\omega x$ [second], it corresponds to an integration over a period proportional to the cycle of the high-frequency component, which allows a better magnetic flux detection. Similarly, an integrator 75 integrates the output from the square calculation unit 72 from the time t−T [second] to the time t second, and outputs the result. Similarly, an integrator 76 integrates the output from the square calculation unit 73 from the time t−T [second] to the time t second, and outputs the result.

Figure 15:
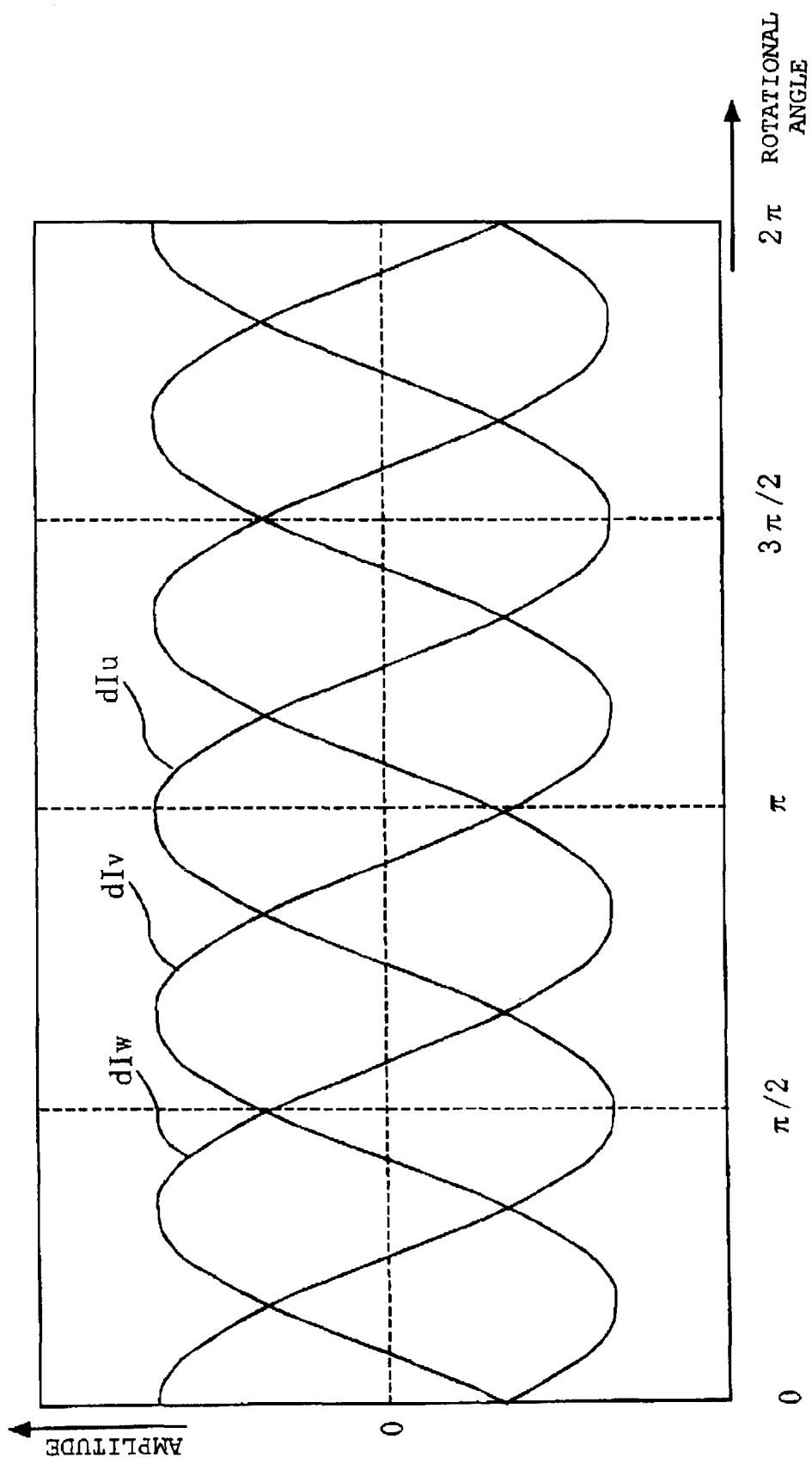
FIG. 15 is a diagram showing relationships between a rotational angle of the AC rotary machine and signals dIu, dIv, and dIw.

A gain-matrix calculation unit 77 regards the integration results obtained from the integrators 74, 75, and 76 as a high-frequency current integration vector, and multiplies the high-frequency current integration vector by the matrix shown in FIG. 14, and outputs the result as signals dIu, dIv, and dIw. Through the series of processes, the signals dIu, dIv, and dIw become signals whose amplitude varies in accordance with the rotational position of the AC rotary machine 2. The relationship between the rotational position of the AC rotary machine 2 and the signals dIu, dIv, and dIw is shown in FIG. 15. As seen in FIG. 15, the signals dIu, dIv, and dIw are periodic functions which are arranged in the phase order of dIu, dIw, and dIv with reference to the rotational position 0 [rad], and have a cycle of n. Therefore, at a two-phase/three-phase converter 78, dIv is interchanged with dIw, and the signals dIu, dIw, and dIv are inputted as a high-frequency current amplitude vector, and then, the result is outputted as an a-axis component Iha and a b-axis component Ihb of the high-frequency current amplitude vector on the a-b axes.

A phase calculation unit 79 calculates expression (8) based on Iha and Ihb, and outputs a phase θ2L of the high-frequency current amplitude vector.

[Expression 8]

$$\theta 2L = \tan^{-1}\left(\frac{Ihb}{Iha}\right) + \pi\frac{(1 - \text{sgn}(Iha))}{2} \quad (8)$$

The cycle of the phase θ2L is twice the cycle of the rotational position of the AC rotary machine 2. Therefore, an angle converter 80 performs phase conversion of the phase θ2L, and outputs the result as the rotational position of the AC rotary machine 2.

Through the above configuration, in a case where rotational position dependence, which is known as saliency, of the inductance is present in the AC rotary machine 2, it is possible to output the detected magnetic flux vector Phi, based on the high-frequency current vector Ish obtained from the current vector detection means 3a.

Similarly to embodiment 1, in the gain matrix 51, in a case where the absolute value of the estimated speed wr0 is large, if the values of h13, h14, h23, h24, h33, h34, h43, and h44 are made to be zero, the output from the gain matrix 51 can be made to be zero in a high-rotation region. In this manner, even if the amplitude A of the high-frequency three-phase voltage instruction vector outputted by the high-frequency voltage instruction vector generator 56 in a high-rotation region is made to be zero, the adaptive observation means 7 will calculate the estimated magnetic flux phase θ0 without using the detected magnetic flux vector Phi. Accordingly, it is possible to attain an effect in which the AC rotary machine 2 can be stably driven even in a high-rotation region.

When a drive in a high-rotation region is to be performed while using the saliency of the inductance, a voltage and a current having a frequency other than that of the fundamental wave will be generated, which is a disadvantage in terms of the operation efficiency, the voltage utilization rate, and the maximum current. However, the above configuration of embodiment 2 allows prevention of occurrence of a voltage and a current having a frequency other than that of the fundamental wave in a high-rotation region, allows a drive which is advantageous in terms of the operation efficiency, the voltage utilization rate, and the maximum current, and further contributes to a downsizing of the device and a longer life of the device.

Embodiment 3

In embodiment 2, the adaptive observation means 7 is configured on the orthogonal two-axis coordinate system (the a-b axes) of rest. However, the adaptive observation means 7 may be configured on a rotational two-axis coordinate system (d-q axes) which rotates synchronously with the estimated magnetic flux phase θ0. It is understood that the method of configuration using the rotational two-axis coordinate system (d-q axes) may be applied to embodiment 1.

Figure 16:
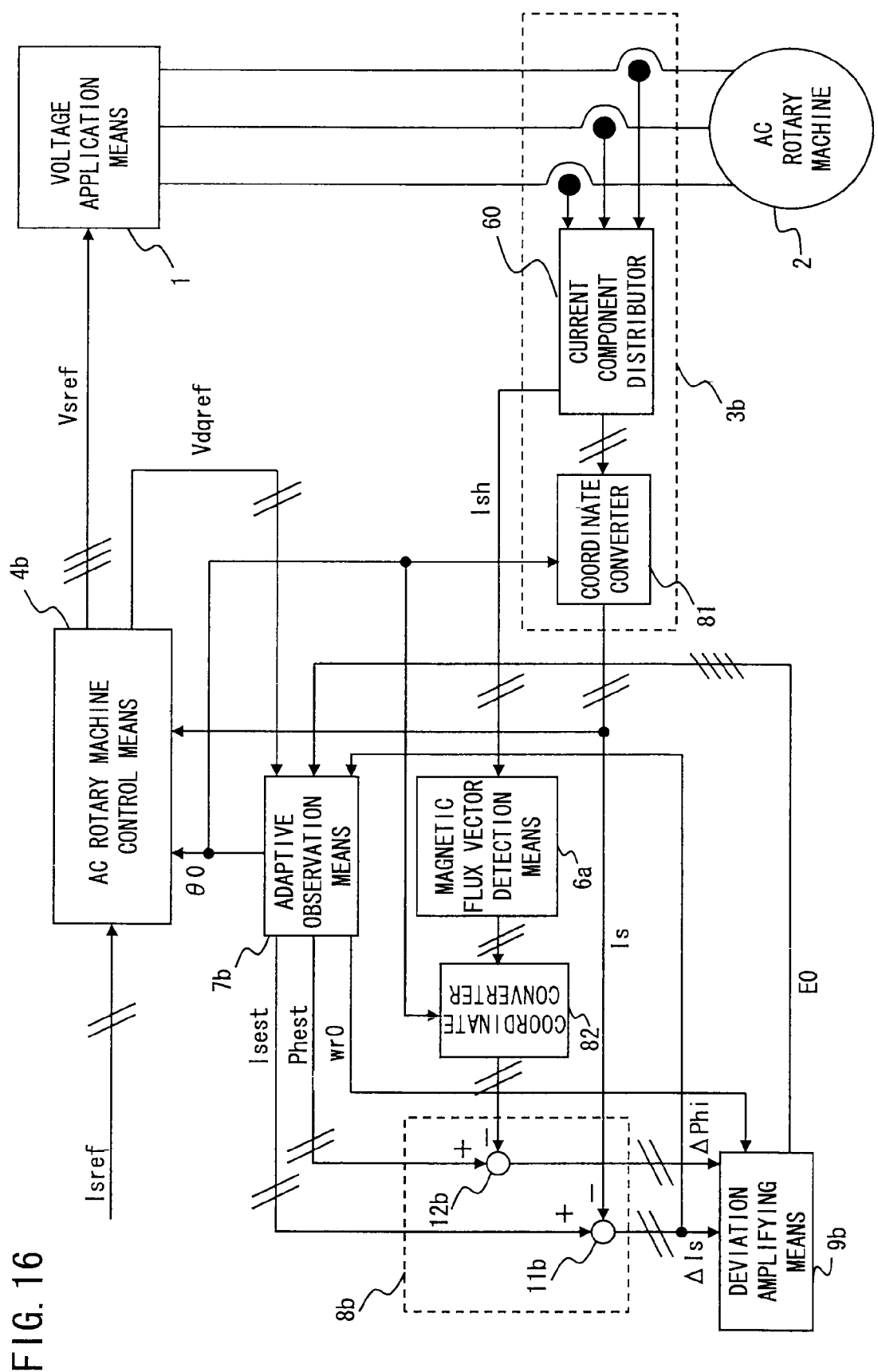
FIG. 16 is a diagram showing an entire configuration of a controller for an AC rotary machine according to embodiment 3 of the present invention.

FIG. 16 is a diagram showing an entire configuration of a controller for an AC rotary machine in the present embodiment 3. Components denoted by the same reference numerals as those in embodiment 2 are the same as or correspond to those in embodiment 2. Current vector detection means 3b includes the current component distributor 60 and a coordinate converter 81, and outputs the detected current vector Is on the rotational two-axis coordinate system. The coordinate converter 81 converts, based on the estimated magnetic flux phase θ0 obtained from adaptive observation means 7b, the detected current vector Is on the a-b axes obtained from the current component distributor 60 into a d-axis component ids and a q-axis component iqs of the detected current vector on the d-q axes, and outputs the result. Similarly, a coordinate converter 82 converts, based on the estimated magnetic flux phase θ0 obtained from the adaptive observation means 7b, the detected magnetic flux vector Phi on the a-b axes obtained from the magnetic flux vector detection means 6a, and outputs the result as a d-axis component phid and a q-axis component phiq of the detected magnetic flux vector on the d-q axes.

AC rotary machine control means 4b outputs to the voltage application means 1 the voltage instruction vector Vsref of three-phase AC currents that allows the detected current vector Is on the d-q axes obtained from the current vector detection means 3b to coincide with the current instruction vector Isref on the d-q axes and that concurrently allows the high-frequency current vector Ish to be generated. The AC rotary machine control means 4b also outputs a voltage instruction vector Vdqref on the rotational two-axis coordinate system to the adaptive observation means 7b. The adaptive observation means 7b outputs, based on the voltage instruction vector Vdqref on the rotational two-axis coordinate system obtained from the AC rotary machine control means 4b, the deviation current vector obtained from deviation vector calculation means 8b, and the amplified deviation vector E0 obtained from deviation amplifying means 9b, the estimated current vector Isest on the rotational two-axis coordinate system, the estimated magnetic flux vector Phest on the rotational two-axis coordinate system, and the estimated speed wr0. The deviation vector calculation means 8b outputs, based on the estimated current vector Isest on the rotational two-axis coordinate system and the detected current vector Is on the rotational two-axis coordinate system, the current deviation vector ΔIs on the rotational two-axis coordinate system, and also outputs, based on the estimated magnetic flux vector Phest on the rotational two-axis coordinate system and the detected magnetic flux vector Phi on the rotational two-axis coordinate system, the magnetic flux deviation vector ΔPhi on the rotational two-axis coordinate system.

At the deviation vector calculation means 8b, the subtractor 11b subtracts the detected current vector Is on the rotational two-axis coordinate system from the estimated current vector Isest on the rotational two-axis coordinate system and outputs the current deviation vector ΔIs (ed, eq)$^T$ on the rotational two-axis coordinate system, and a subtractor 12b subtracts the detected magnetic flux vector Phi on the rotational two-axis coordinate system from the estimated magnetic flux vector Phest on the rotational two-axis coordinate system and outputs the magnetic flux deviation vector ΔPhi on the rotational two-axis coordinate system. The deviation amplifying means 9b amplifies the current deviation vector ΔIs on the rotational two-axis coordinate system and the magnetic flux deviation vector ΔPhi on the rotational two-axis coordinate system in accordance with the estimated speed wr0, and outputs the result as the amplified deviation vector E0 (f1, f2, f3, f4)$^T$ on the rotational two-axis coordinate system, to the adaptive observation means 7b.

Figure 17:
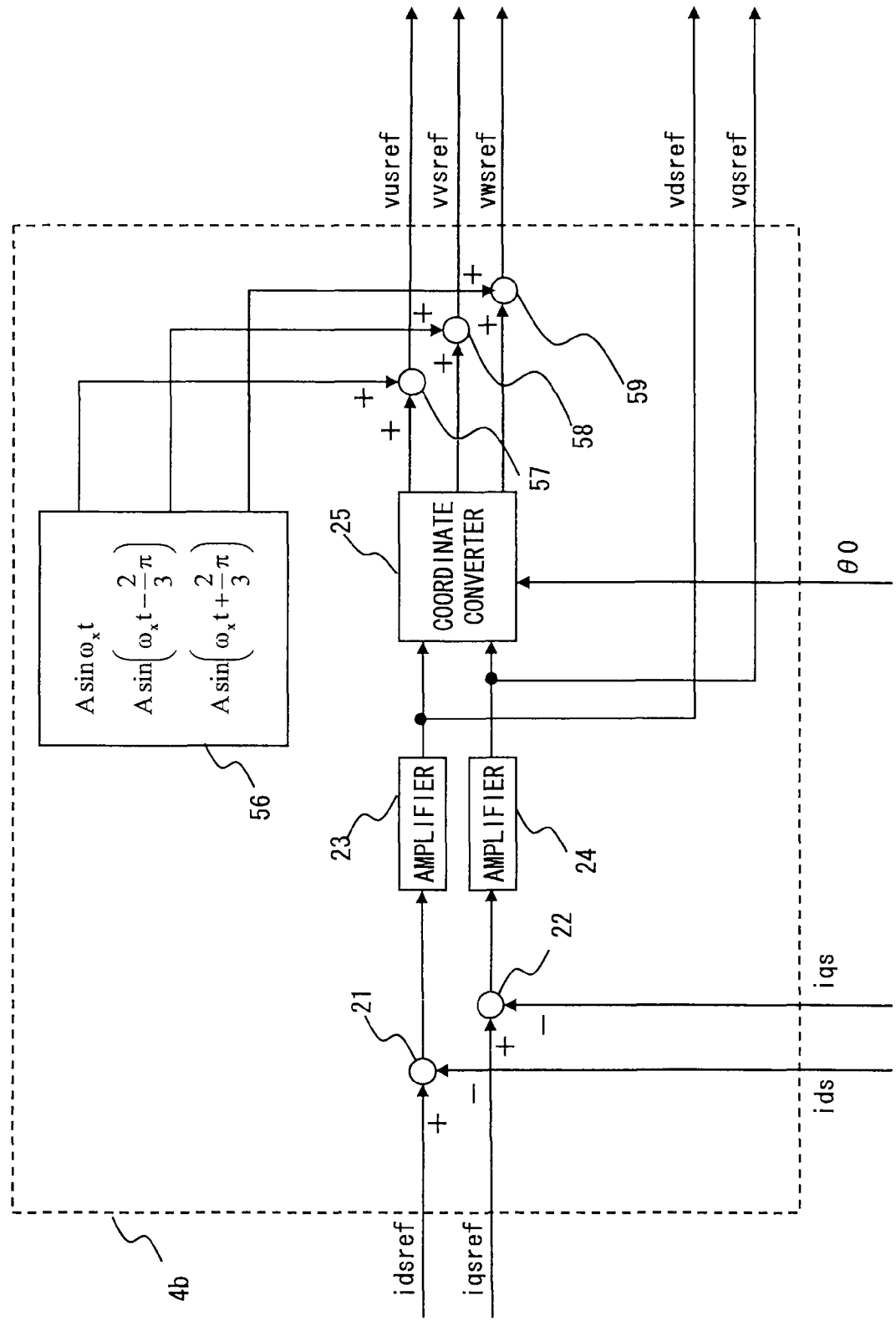
FIG. 17 is a diagram showing an internal configuration of AC rotary machine control means 4b in FIG. 16.

FIG. 17 is a diagram showing an internal configuration of the AC rotary machine control means 4b, and components denoted by the same reference numerals as those in FIG. 12 are the same as or corresponds to those in FIG. 12. Differences between FIG. 17 and FIG. 12 are as follows: in FIG. 17, the detected current vector Is obtained from the current vector detection means 3b is on the rotational two-axis coordinate system, and the coordinate converter 20 is eliminated, and the outputs from the amplifier 23 and the amplifier 24 are outputted as a d-axis component vdsref and a q-axis component vqsref of the voltage instruction vector on the rotational two-axis coordinate system.

Figure 18:
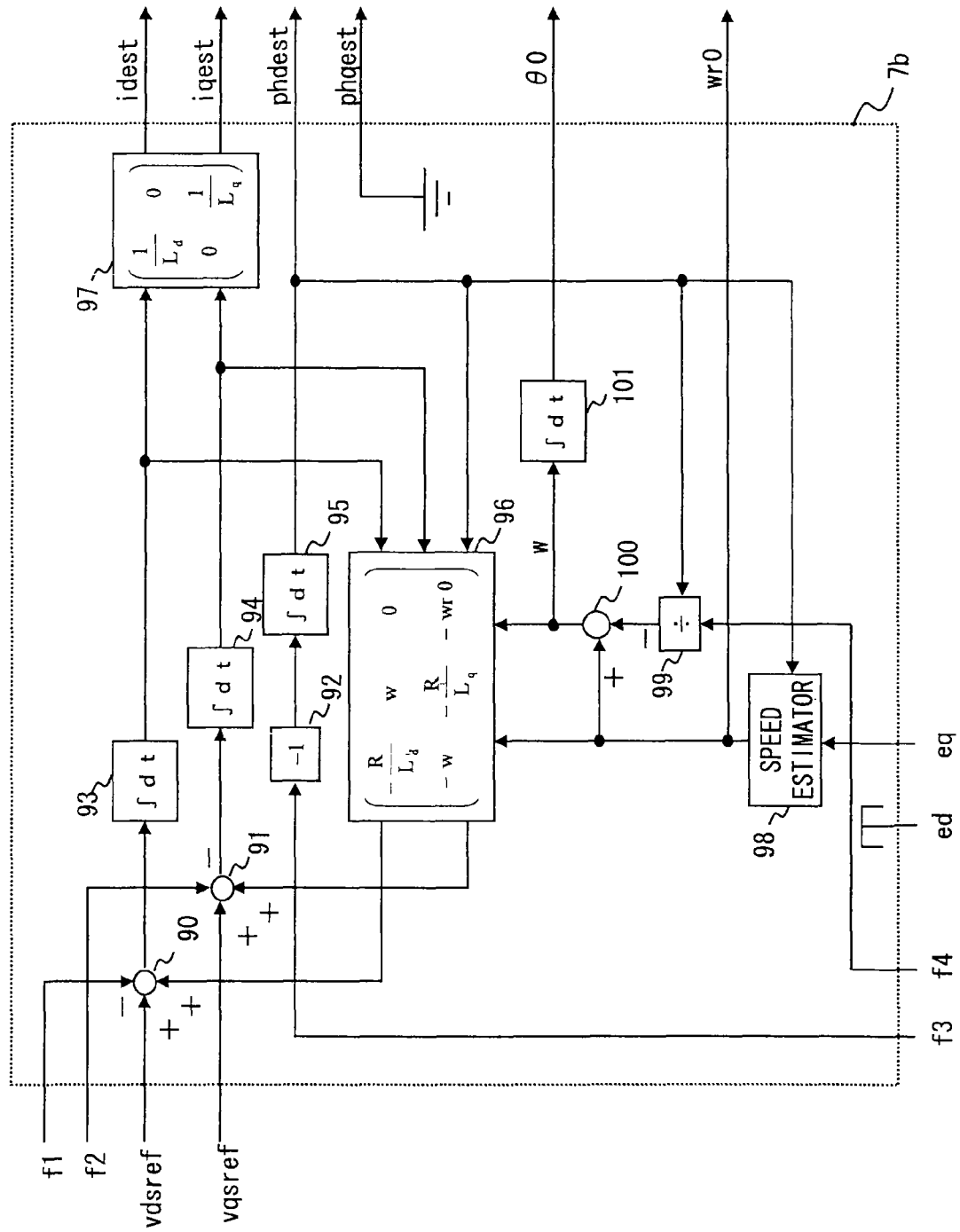
FIG. 18 is a diagram showing an internal configuration of adaptive observation means 7b in FIG. 16.

FIG. 18 is a diagram showing an internal configuration of the adaptive observation means 7b configured on a rotational two-axis coordinate system (d-q axes) which rotates synchronously with the estimated magnetic flux phase 80.

Hereinafter, an angular frequency at which the rotational two-axis coordinate system (d-q axes) rotates is defined as w, the d-axis component of the estimated current vector on the d-q axes is defined as ids0, the q-axis component of the estimated current vector on the d-q axes is defined as iqs0, the d-axis component of an estimated armature reaction vector on the d-q axes is defined as pds0, the q-axis component of the estimated armature reaction vector on the d-q axes is defined as pqs0, the d-axis component of the estimated magnetic flux vector on the d-q axes is defined as pdr0, the q-axis component of the estimated magnetic flux vector on the d-q axes is defined as pqr0, the d-axis inductance of the AC rotary machine 2 is defined as Ld, and the q-axis inductance of the AC rotary machine 2 is defined as Lq.

In FIG. 18, an adder-subtractor 90 adds the d-axis component vdsref of the voltage instruction vector on the rotational two-axis coordinate system and a first component of an output outputted by a gain matrix 96 described below, subtracts from the resultant value a first component f1 of the amplified deviation vector E0 on the rotational two-axis coordinate system, and outputs the result. Similarly, an adder-subtractor 91 adds the q-axis component vqsref of the voltage instruction vector on the rotational two-axis coordinate system and a second component of the output outputted by the gain matrix 96 described below, subtracts from the resultant value a second component f2 of the amplified deviation vector E0 on the rotational two-axis coordinate system, and outputs the result. A sign inverter 92 inverts the sign of a third component f3 of the amplified deviation vector E0 on the rotational two-axis coordinate system and outputs the result. An integrator 93 integrates the output from the adder-subtractor 90 and outputs the d-axis component pds0 of the estimated armature reaction vector. Similarly, an integrator 94 integrates the output from the adder-subtractor 91 and outputs the q-axis component pqs0 of the estimated armature reaction vector. An integrator 95 outputs the d-axis component pdr0 of the estimated magnetic flux vector which has been obtained by integration of the output from the sign inverter 92, as a d-axis component phdest thereof. It should be noted that since the adaptive observation means 7b is configured on the rotational two-axis coordinate system (d-q axes) which rotates synchronously with the estimated magnetic flux phase θ0, a q-axis component phqest of the estimated magnetic flux vector is zero.

The gain matrix 96 multiplies a matrix including the estimated speed wr0, the angular frequency w, the armature resistance R, the d-axis inductance Ld, and the q-axis inductance Lq by a vector $(pds0, pqs0, pdr0)^T$, and outputs the result. A gain matrix 97 multiplies a matrix including the d-axis inductance Ld and the q-axis inductance Lq by a vector $(pds0, pqs0)^T$, and outputs a resultant d-axis component ids0 of the estimated current vector as a d-axis component idest thereof, and a resultant q-axis component iqs0 of the estimated current vector as a q-axis component iqest thereof.

A speed estimator 98 amplifies, by a proportional integral, a value obtained by division of a q-axis component eq of the current deviation vector on the rotational two-axis coordinate system by the d-axis component pdr0 of the estimated magnetic flux vector, and outputs the result as the estimated speed wr0. In the adaptive observation means 7b according to the present embodiment 3, a d-axis component ed of the current deviation vector on the rotational two-axis coordinate system is not used.

A divider 99 divides a fourth component f4 of the amplified deviation vector E0 on the rotational two-axis coordinate system by the d-axis component pdr0 of the estimated magnetic flux vector, and outputs the result. A subtractor 100 subtracts the output of the divider 99, from the output wr0 of the speed estimator 98, and outputs the result as the angular frequency w. An integrator 101 integrates the angular frequency w, and outputs the result as the estimated magnetic flux phase θ0.

As described above, even when the adaptive observation means 7b is configured on the rotational two-axis coordinate system (d-q axes) which rotates synchronously with the estimated magnetic flux phase θ0, it is possible to obtain a similar effect as in embodiment 2.

That is, the adaptive observation means 7b calculates the estimated magnetic flux phase based on the current deviation vector on the rotational two-axis coordinate system and based on the amplified deviation vector on the rotational two-axis coordinate system, such that the deviation between the estimated current vector on the rotational two-axis coordinate system and the detected current vector on the rotational two-axis coordinate system and the deviation between the estimated magnetic flux vector on the rotational two-axis coordinate system and the detected magnetic flux vector on the rotational two-axis coordinate system become small. Then, the AC rotary machine control means 4b calculates the voltage instruction vector based on the estimated magnetic flux phase, and the voltage application means 1 applies a voltage to the AC rotary machine 2 based on the voltage instruction vector. Therefore, according to this configuration, as in embodiment 1, by appropriately setting the gain matrices 50 and 51 of the deviation amplifying means 9b, it is possible to, in a high-rotation region, make zero the amplitude of the voltage instruction vector which is outputted by the high-frequency voltage instruction vector generator 56 included in the AC rotary machine control means 4b. As a result, it is possible to realize a drive that does not generate a voltage and a current having a frequency other than that of the fundamental wave in a high-rotation region, and therefore, it is possible to realize a drive that is advantageous in terms of the operation efficiency, the voltage utilization rate, and the suppression of the maximum current in a high-rotation region.

Embodiment 4

The examples in the above embodiments are each configured such that the current instruction vector Isref is directly provided to the AC rotary machine control means 4 and 4b. However, speed control means 110 may be included which calculates the current instruction vector Isref so as to coincide with an angular velocity instruction wrref, based on the estimated speed wr0 outputted by the adaptive observation means 7 and 7b.

Figure 19:
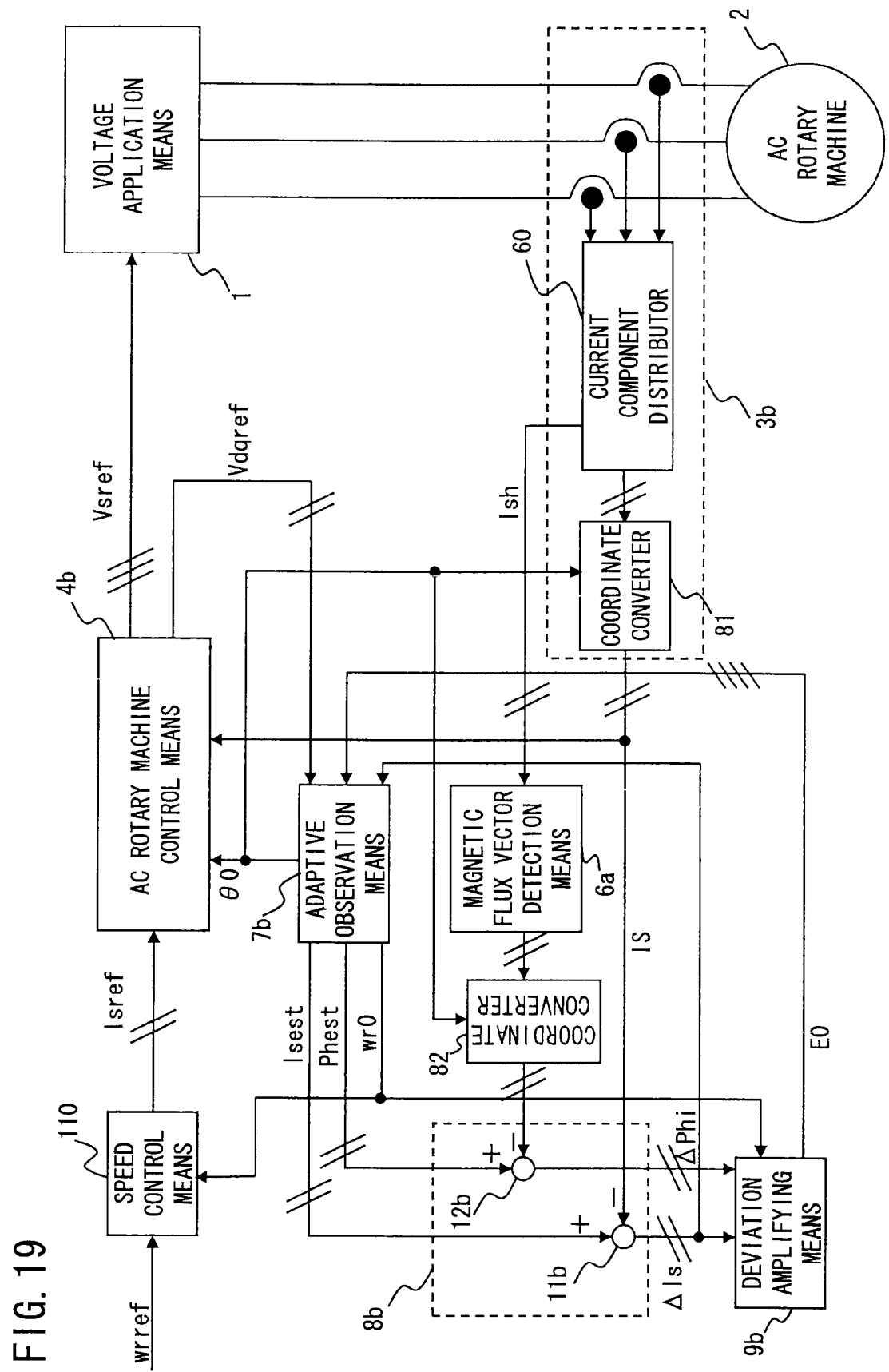
FIG. 19 is a diagram showing an entire configuration of a controller for an AC rotary machine according to embodiment 4 of the present invention.

FIG. 19 is a diagram showing a configuration of a controller for an AC rotary machine in the present embodiment 4. In FIG. 19, components denoted by the same reference numerals as those in FIG. 16 are the same as or correspond to those in FIG. 16.

Figure 20:
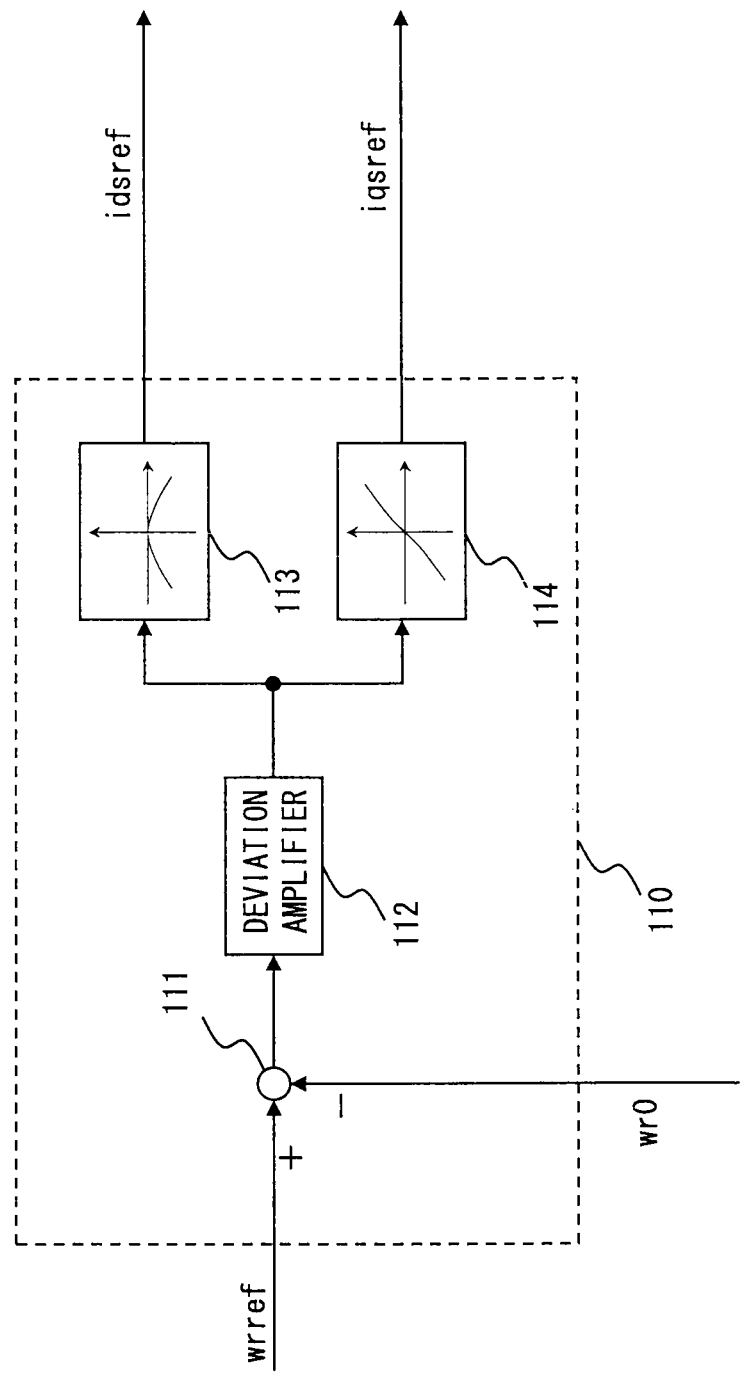
FIG. 20 is a diagram showing an internal configuration of speed control means 110 in FIG. 19.

The speed control means 110 receives the angular velocity instruction wrref as an input, and outputs to the AC rotary machine control means 4b the current instruction vector Isref on the rotational two-axis coordinate system (d-q axes), the current instruction vector Isref allowing the estimated speed wr0 obtained from the adaptive observation means 7b to coincide with the angular velocity instruction wrref. FIG. 20 is a diagram showing an internal configuration of the speed control means 110. A subtractor 111 subtracts the estimated speed wr0 from the angular velocity instruction wrref, and outputs a speed deviation. A deviation amplifier 112 amplifies the speed deviation obtained from the subtractor 111 by means of a proportional integral, and outputs the resultant value as a torque instruction. A d-axis current instruction calculation unit 113 outputs, in accordance with the torque instruction, a d-axis component of the current vector instruction on the rotational two-axis coordinate system (d-q axes) for efficiently driving the AC rotary machine 2, by means of a known method. Similarly, a q-axis current instruction calculation unit 114 outputs, in accordance with the torque instruction, a q-axis component of the current vector instruction on the rotational two-axis coordinate system (d-q axes) for efficiently driving the AC rotary machine 2, by means of a known method.

Through the above configuration, in addition to the effects of the above embodiments, it is possible to obtain an effect in which the rotational speed of the AC rotary machine 2 can be made to coincide with the angular velocity instruction wrref because the speed control means 110 calculates, based on the estimated speed wr0 outputted by the adaptive observation means 7b, the current instruction vector Isref so as to coincide with the angular velocity instruction wrref.

Embodiment 5

In embodiment 1, the adaptive observation means 7 is configured to output the estimated magnetic flux phase θ0, the estimated current vector Isest, the estimated magnetic flux vector Phest, and the estimated speed wr0, based on the amplified deviation vector E0, the current deviation vector ΔIs, and the voltage instruction vector Vsref. However, as described below, the adaptive observation means 7 may be configured to output the estimated magnetic flux phase θ0 and the estimated magnetic flux vector Phest, based on the amplified deviation vector E0, the detected current vector Is, and the voltage instruction vector Vsref.

Further, in embodiment 1, the deviation vector calculation means 8 is configured to output the current deviation vector ΔIs based on the estimated current vector Isest and the detected current vector Is and also to output the magnetic flux deviation vector ΔPhi based on the estimated magnetic flux vector Phest and the detected magnetic flux vector Phi. However, the deviation vector calculation means 8 may be configured to output the magnetic flux deviation vector ΔPhi based on the estimated magnetic flux vector Phest and the detected magnetic flux vector Phi.

Further, in embodiment 1, the deviation amplifying means 9 is configured to amplify the current deviation vector ΔIs and the magnetic flux deviation vector ΔPhi in accordance with the estimated speed wr0 and to output the result as the amplified deviation vector E0 to the adaptive observation means 7. However, the deviation amplifying means 9 may be configured to amplify the magnetic flux deviation vector ΔPhi and to output the result as the amplified deviation vector E0 to the adaptive observation means 7.

Figure 22:
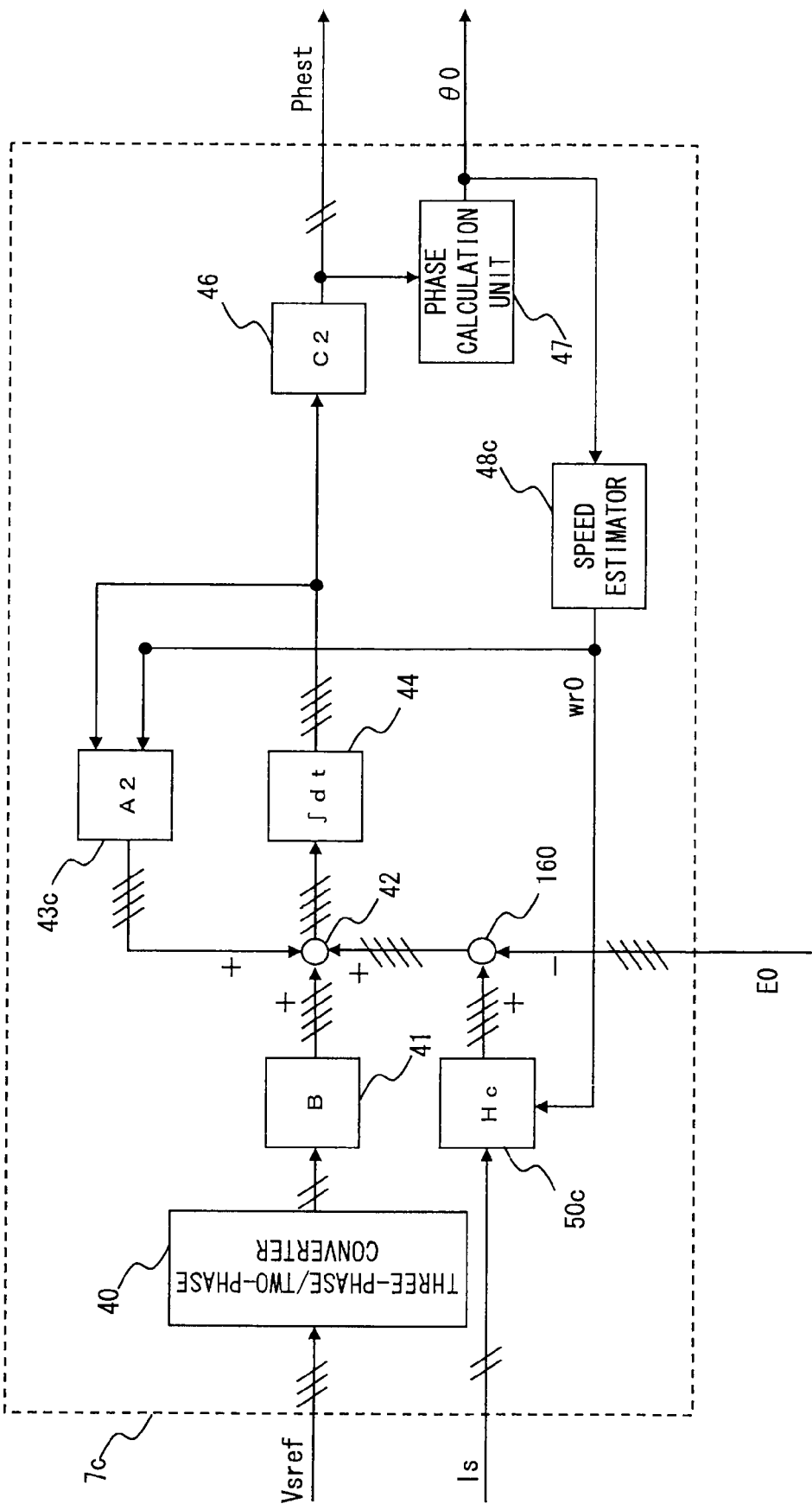
FIG. 22 is a diagram showing an internal configuration of adaptive observation means 7c in FIG. 21.
Figure 23:
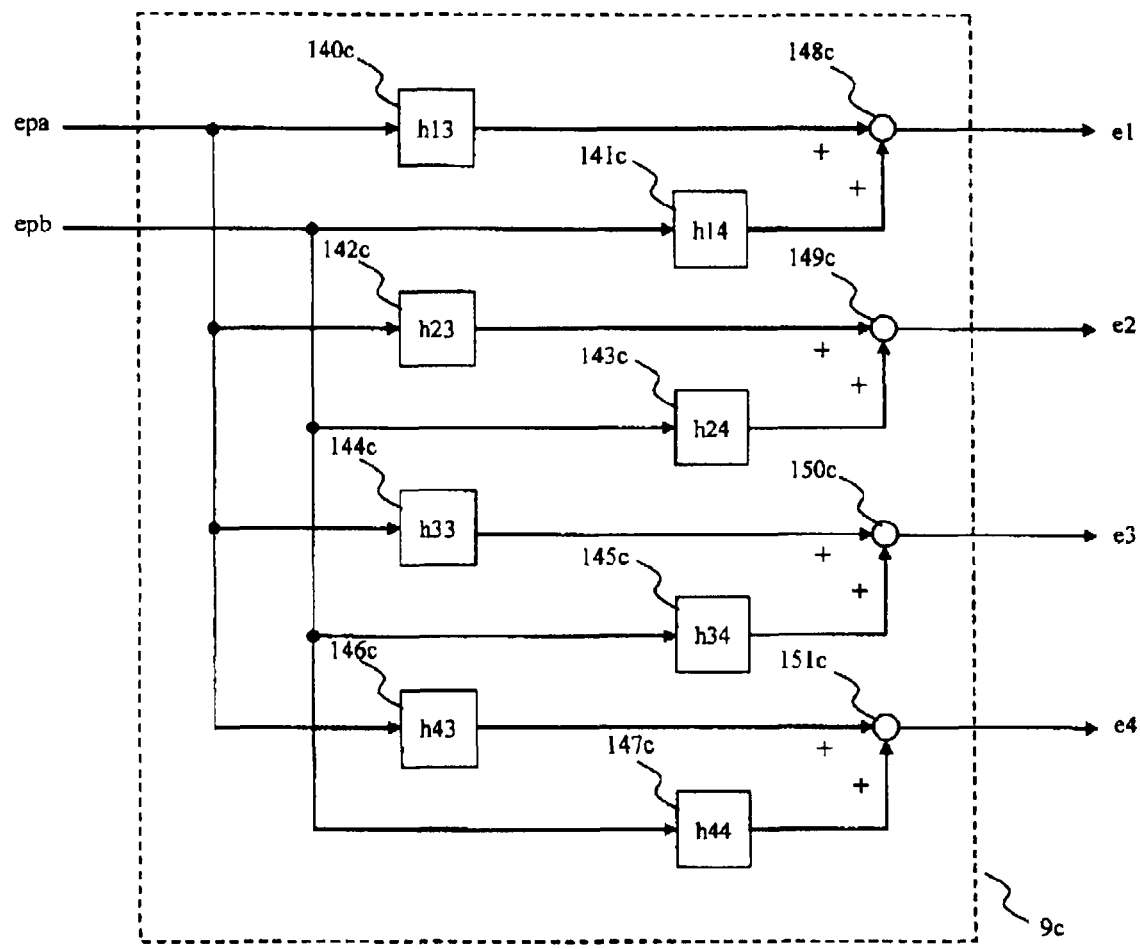
FIG. 23 is a diagram showing an internal configuration of deviation amplifying means 9c in FIG. 21.

As described in the last part of the description of embodiment 1, depending on conditions, it is possible to set amplification gains of the deviation amplifying means 9, irrespective of the estimated speed. Embodiment 5 employs that method. As shown in FIG. 22 described below, the estimated speed wr0 is generated inside adaptive observation means 7c, but not outputted to the outside, and as shown in FIG. 23 described below, the estimated speed wr0 is not received by deviation amplifying means 9c.

As described in FIG. 1 and the like in embodiment 1, it is understood that the adaptive observation means may output the estimated speed wr0 and the deviation amplifying means may receive the estimated speed wr0 and set amplification gains. In this case, as described in detail in embodiment 1, a further advantageous effect will be obtained.

Figure 21:
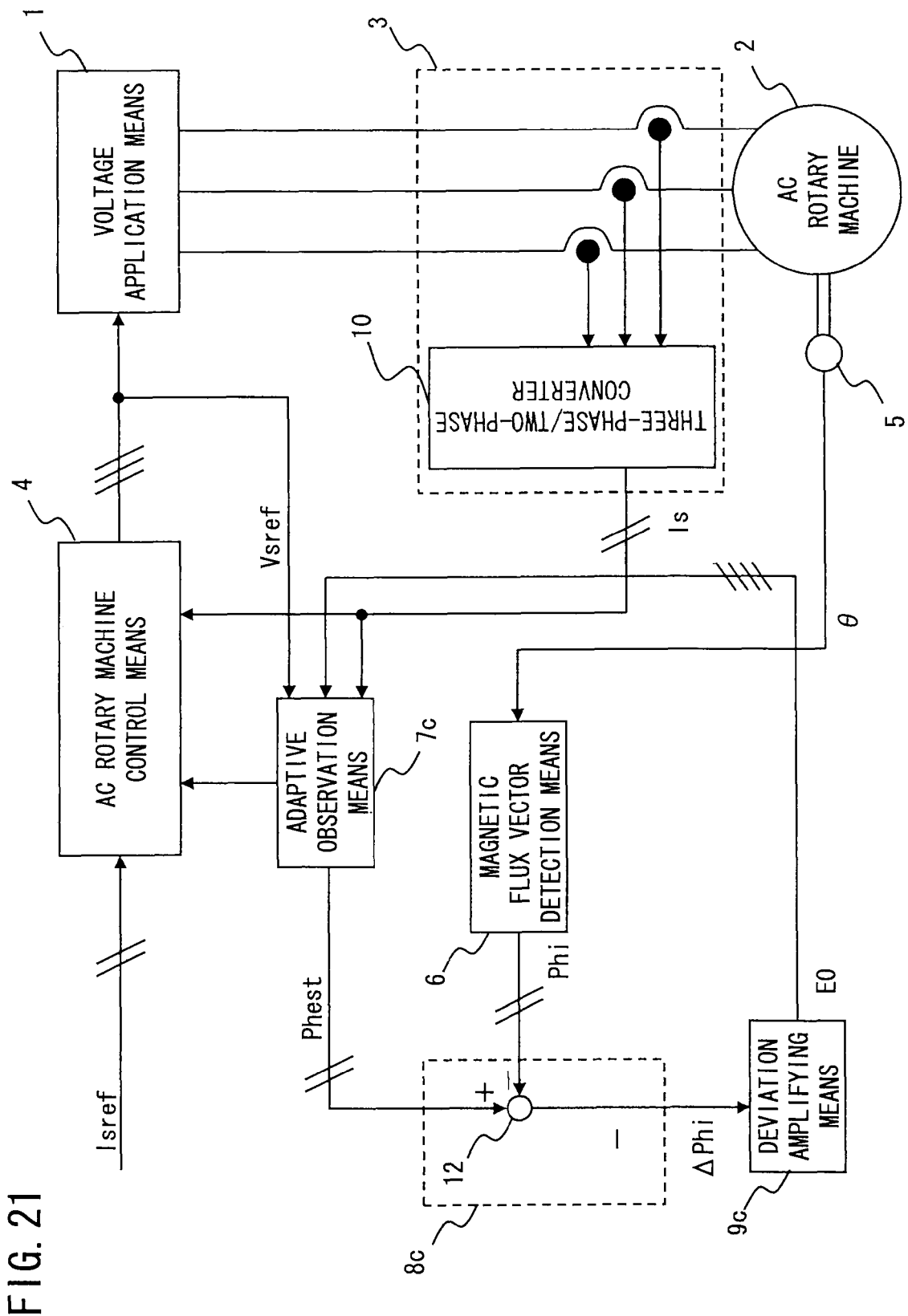
FIG. 21 is a diagram showing an entire configuration of a controller for an AC rotary machine according to embodiment 5 of the present invention.

FIG. 21 is a diagram showing an entire configuration of the present embodiment 5. In FIG. 21, components denoted by the same reference numerals as those in FIG. 1 are the same as or correspond to those in FIG. 1. The adaptive observation means 7c outputs the estimated magnetic flux phase θ0, the estimated magnetic flux vector Phest, and the estimated speed wr0, based on the amplified deviation vector E0 obtained from the deviation amplifying means 9c, the detected current vector Is obtained from the current vector detection means 3, and the voltage instruction vector Vsref obtained from the AC rotary machine control means 4.

Deviation vector calculation means 8c calculates a difference between the estimated magnetic flux vector Phest obtained from the adaptive observation means 7c and the detected magnetic flux vector Phi obtained from the magnetic flux vector detection means 6, and outputs the difference as the magnetic flux deviation vector ΔPhi. The deviation amplifying means 9c amplifies the magnetic flux deviation vector ΔPhi, and outputs the amplified magnetic flux deviation vector ΔPhi as the amplified deviation vector E0 to the adaptive observation means 7c.

FIG. 22 is a diagram showing an internal configuration of the adaptive observation means 7c. In FIG. 22, components denoted by the same reference numerals as those in FIG. 5 are the same as or correspond to those in FIG. 5. Before the configuration shown in FIG. 22 is described, the principle used in FIG. 22 will be described. Expression (9) is obtained from the relationship defined in expression (2).

[Expression 9]

$$\frac{d}{dt}\begin{pmatrix} pas0 \\ pbs0 \\ par0 \\ pbr0 \end{pmatrix} = A \begin{pmatrix} pas0 \\ pbs0 \\ par0 \\ pbr0 \end{pmatrix} + B \begin{pmatrix} vas^* \\ vbs^* \end{pmatrix} - \begin{pmatrix} e1 \\ e2 \\ e3 \\ e4 \end{pmatrix}$$
$$= A \begin{pmatrix} pas0 \\ pbs0 \\ par0 \\ pbr0 \end{pmatrix} + B \begin{pmatrix} vas^* \\ vbs^* \end{pmatrix} - \left( \begin{pmatrix} ec1 \\ ec2 \\ ec3 \\ ec4 \end{pmatrix} + \begin{pmatrix} ep1 \\ ep2 \\ ep3 \\ ep4 \end{pmatrix} \right) \quad (9)$$

Further, in consideration of expression (4) and the output vector (ec1, ec2, ec3, ec4)$^T$ being outputs from the gain matrix 50, expression (10) is obtained.

[Expression 10]

$$\frac{d}{dt}\begin{pmatrix} pas0 \\ pbs0 \\ par0 \\ pbr0 \end{pmatrix} = A\begin{pmatrix} pas0 \\ pbs0 \\ par0 \\ pbr0 \end{pmatrix} + B\begin{pmatrix} vas^* \\ vbs^* \end{pmatrix} - \left(Hc\left(\begin{pmatrix} ias0 \\ ibs0 \end{pmatrix} - \begin{pmatrix} ias \\ ibs \end{pmatrix}\right) + \begin{pmatrix} ep1 \\ ep2 \\ ep3 \\ ep4 \end{pmatrix}\right) \quad (10)$$

$$= A\begin{pmatrix} pas0 \\ pbs0 \\ par0 \\ pbr0 \end{pmatrix} + B\begin{pmatrix} vas^* \\ vbs^* \end{pmatrix} -$$

$$\left(Hc\left(C1\begin{pmatrix} pas0 \\ pbs0 \\ par0 \\ pbr0 \end{pmatrix} - \begin{pmatrix} ias \\ ibs \end{pmatrix}\right) + \begin{pmatrix} ep1 \\ ep2 \\ ep3 \\ ep4 \end{pmatrix}\right)$$

when expression (10) is expanded and simplified, expressions (11) and (12) are obtained.

[Expression 11]

$$\frac{d}{dt}\begin{pmatrix} pas0 \\ pbs0 \\ par0 \\ pbr0 \end{pmatrix} = A2\begin{pmatrix} pas0 \\ pbs0 \\ par0 \\ pbr0 \end{pmatrix} + B\begin{pmatrix} vas^* \\ vbs^* \end{pmatrix} + Hc\begin{pmatrix} ias \\ ibs \end{pmatrix} - \begin{pmatrix} eq1 \\ ep2 \\ ep3 \\ ep4 \end{pmatrix} \quad (11)$$

[Expression 12]

$$\text{where } A2 = A - HcC1 \quad (12)$$

Here, since matrix A and matrix Hc on the right side of expression (12) are functions of the estimated speed wr0, matrix A2 is also a function of the estimated speed wr0 as matrix A is.

When expression (11) and expression (2) are compared, expression (11) is different from expression (2) in that matrix A2 corresponds to matrix A in expression (2), a result of multiplication of the detected current vector by matrix Hc is added, and the magnetic flux deviation vector corresponds to the amplified deviation vector in expression (2).

In FIG. 22, a gain-matrix calculation unit 43c obtains matrix A2 defined by expression (12), based on the estimated speed wr0, and outputs a result obtained by multiplying matrix A2 by the vector (pas0, pbs0, par0, pbr0)$^T$. A gain matrix 50c outputs a result obtained by multiplying the detected current vector (ias, ibs)$^T$ by matrix Hc. Here, matrix Hc is given to the gain matrix 50c as appropriate based on the estimated speed wr0, as in the gain matrix 50. A subtractor 160 subtracts an amplified deviation vector (e1, e2, e3, e4)$^T$ from the output of the gain matrix 50c. As described below, the amplified deviation vector (e1, e2, e3, e4)$^T$ corresponds to the output vector (ep1, ep2, ep3, ep4)$^T$ from the gain matrix 51 in embodiment 1. The speed estimator 48 in embodiment 1 performs calculation of expression (3), based on the inputted estimated magnetic flux vector (par0, pbr0)$^T$ and the inputted current deviation vector (ea, eb)$^T$, and outputs the estimated speed wr0. However, a speed estimator 48c in embodiment 5 outputs the estimated speed wr0 based on the estimated magnetic flux phase θ0. Specifically, the estimated speed wr0 is regarded as a change rate of the estimated magnetic flux phase 80, and the speed estimator 48c performs calculation of expression (13) and outputs the estimated speed wr0.

[Expression 13]

$$wr0 = \frac{d}{dt}\theta 0 \quad (13)$$

FIG. 23 is a diagram showing an internal configuration of the deviation amplifying means 9c. In FIG. 23, an amplification gain 140c multiplies a gain h13 and an a-axis component epa of a magnetic flux deviation vector on the a-b axes, and outputs the result. An amplification gain 141c multiplies a gain h14 and a b-axis component epb of the magnetic flux deviation vector on the a-b axes, and outputs the result. Similarly, an amplification gain 142c multiplies a gain h23 and the a-axis component epa of the magnetic flux deviation vector on the a-b axes, and outputs the result. An amplification gain 143c multiplies the gain h24 and the b-axis component epb of the magnetic flux deviation vector on the a-b axes, and outputs the result. Similarly, an amplification gain 144c multiplies the gain h33 and the a-axis component epa on the magnetic flux deviation vector on the a-b axes, and outputs the result. An amplification gain 145c multiplies a gain h34 and the b-axis component epb of the magnetic flux deviation vector on the a-b axes, and outputs the result. Similarly, an amplification gain 146c multiplies a gain h43 and the a-axis component epa of the magnetic flux deviation vector on the a-b axes, and outputs the result. An amplification gain 147c multiplies a gain h44 and the b-axis component epb of the magnetic flux deviation vector on the a-b axes, and outputs the result.

Then, an adder 148c adds the output from the amplification gain 140 and the output from the amplification gain 141, and outputs the result as an amplified deviation e1. Similarly, an adder 149c adds the output from the amplification gain 142 and the output from the amplification gain 143c, and outputs the result as an amplified deviation e2. Similarly, an adder 150c adds the output from the amplification gain 144 and the output from the amplification gain 145c, and outputs the result as an amplified deviation e3. Similarly, an adder 151c adds the output from the amplification gain 146 and the output from the amplification gain 147c, and outputs the result as an amplified deviation e4.

The amplification gains h13, h14, h23, h24, h33, h34, h43, and h44 may be set to 0 excluding h33 and h44 as in FIG. 10. In this case, the amplification gains 140c, 141c, 142c, 143c, 145c, and 146c in FIG. 23 may be omitted.

With respect to h33 and h44, in embodiment 1, even in a case where a rotational position detection means 5 is used that is inexpensive and whose reliability is reduced in accordance with an increase in the rotational speed, the h33 and h44 are configured to have a predetermined magnitude for a speed range in which the reliability can be maintained, and the h33 and h44 are set to zero for the other speed ranges, whereby generation of a magnetic flux deviation vector is prevented. However, in the case of rotational position detection means 5 that is inexpensive and has low responsiveness and low reliability but maintains a certain performance level at a high rotational speed, the h33 and h44 may be set at fixed values. With this configuration, as described in embodiment 1, stability of the adaptive observation means 7c while the AC rotary machine 2 is stopped can be maintained, and even if the adaptive observation means 7c may become unstable due to an unexpected operation in a high-rotation region, the deviation between the estimated magnetic flux vector and the detected magnetic flux vector functions to correct the estimated magnetic flux vector outputted by the adaptive observation means 7c. Therefore, even in a case where the phase difference between the estimated magnetic flux vector and the detected magnetic flux vector exceeds 90 degrees due to an initial value error or a disturbance, or the phase difference is small, it is possible to maintain the error convergence characteristic and the responsiveness of the position estimation. As a result, it is possible to obtain an effect in which the AC rotary machine 2 can be driven stably.

In the above description of embodiment 5, it is assumed that the deviation amplifying means 9c is provided. However, the deviation amplifying means 9c is configured to amplify a deviation magnetic flux vector ΔPhi by a certain amplification gain, irrespective of the estimated speed wr0. Therefore, actually, the deviation amplifying means 9c may be omitted, and the output from the deviation vector calculation means 8c may be directly outputted as the amplified deviation vector E0 to the adaptive observation means 7c.

INDUSTRIAL APPLICABILITY

The present invention is applicable to a controller for driving a variety of AC rotary machines which are driven in a wide speed range, and can attain a specific effect in which a smooth drive can be realized from a low-speed region including zero speed to a high-speed region, and even when an initial value error is present in an estimated phase, desired characteristics can be obtained by promptly converging the error.

The invention claimed is:

1. A controller for an AC rotary machine, the controller comprising:
   current vector detection means for detecting a current vector of the AC rotary machine and outputting the current vector as a detected current vector;
   AC rotary machine control means for referring to an estimated magnetic flux phase and outputting a voltage instruction vector such that the detected current vector coincides with a current instruction vector;
   voltage application means for applying a voltage to the AC rotary machine based on the voltage instruction vector;
   adaptive observation means for outputting the estimated magnetic flux phase based on the voltage instruction vector; and
   magnetic flux vector detection means for detecting a magnetic flux vector and outputting the magnetic flux vector as a detected magnetic flux vector, wherein
   the adaptive observation means outputs an estimated current vector and an estimated magnetic flux vector in addition to the estimated magnetic flux phase, based on a current deviation vector and an amplified deviation vector in addition to the voltage instruction vector, and
   the controller further comprises deviation vector calculation means for calculating the current deviation vector which is a deviation between the estimated current vector and the detected current vector and a magnetic flux deviation vector which is a deviation between the estimated magnetic flux vector and the detected magnetic flux vector and for outputting the calculated current deviation vector and the calculated magnetic flux deviation vector as the amplified deviation vector.

2. A controller for an AC rotary machine, the controller comprising:
   current vector detection means for detecting a current vector of the AC rotary machine and outputting the current vector as a detected current vector;
   AC rotary machine control means for referring to an estimated magnetic flux phase and outputting a voltage instruction vector such that the detected current vector coincides with a current instruction vector;
   voltage application means for applying a voltage to the AC rotary machine based on the voltage instruction vector;
   adaptive observation means for outputting the estimated magnetic flux phase based on the voltage instruction vector; and
   magnetic flux vector detection means for detecting a magnetic flux vector and outputting the magnetic flux vector as a detected magnetic flux vector, wherein
   the adaptive observation means outputs an estimated magnetic flux vector in addition to the estimated magnetic flux phase, based on an amplified deviation vector in addition to the voltage instruction vector, and
   the controller further comprises deviation vector calculation means for calculating a magnetic flux deviation vector which is a deviation between the estimated magnetic flux vector and the detected magnetic flux vector and for outputting the calculated magnetic flux deviation vector as the amplified deviation vector.

3. The controller for the AC rotary machine according to claim 1, wherein
   the adaptive observation means further outputs an estimated speed,
   the controller further includes deviation amplifying means, which is provided between the deviation vector calculation means and the adaptive observation means, which amplifies an output from the deviation vector calculation means by a predetermined gain using the estimated speed as a parameter, and which outputs the amplified output as the amplified deviation vector to the adaptive observation means, and
   the gain by which the magnetic flux deviation vector is amplified in the deviation amplifying means is set to have a value that is smaller at a time when the estimated speed is high, than a value at a time when the estimated speed is low.

4. The controller for the AC rotary machine according to claim 1, wherein
   the magnetic flux vector detection means outputs the detected magnetic flux vector, based on a rotational position which is an output from rotational position detection means for detecting a rotational position of the AC rotary machine.

5. The controller for the AC rotary machine according to claim 1, wherein
   the controller further includes voltage superimposing means for superimposing a high-frequency voltage which has a higher frequency than a fundamental frequency for driving the AC rotary machine, on the AC rotary machine, and
   the magnetic flux vector detection means outputs the detected magnetic flux vector based on a high-frequency current vector due to the high-frequency voltage extracted by the current vector detection means.

6. The controller for the AC rotary machine according to claim 5, wherein
   an amplitude of the high-frequency voltage to be superimposed in the voltage superimposing means is set to have a value that is smaller at a time when the rotational speed of the AC rotary machine is high, than a value at a time when the rotational speed of the AC rotary machine is low.

7. The controller for the AC rotary machine according to claim 1, wherein
   the controller further includes speed control means for generating the current instruction vector such that the estimated speed from the adaptive observation means coincides with an angular velocity instruction and for outputting the generated current instruction vector to the AC rotary machine control means.

8. The controller for the AC rotary machine according to claim 2, wherein the adaptive observation means further outputs an estimated speed, the controller further includes deviation amplifying means, which is provided between the deviation vector calculation means and the adaptive observation means, which amplifies an output from the deviation vector calculation means by a predetermined gain using the estimated speed as a parameter, and which outputs the amplified output as the amplified deviation vector to the adaptive observation means, and the gain by which the magnetic flux deviation vector is amplified in the deviation amplifying means is set to have a value that is smaller at a time when the estimated speed is high, than a value at a time when the estimated speed is low.

9. The controller for the AC rotary machine according to claim 2, wherein the magnetic flux vector detection means outputs the detected magnetic flux vector, based on an rotational position which is an output from rotational position detection means for detecting a rotational position of the AC rotary machine.

10. The controller for the AC rotary machine according to claim 2, wherein the controller further includes voltage superimposing means for superimposing a high-frequency voltage which has a higher frequency than a fundamental frequency for driving the AC rotary machine, on the AC rotary machine, and the magnetic flux vector detection means outputs the detected magnetic flux vector based on a high-frequency current vector due to the high-frequency voltage extracted by the current vector detection means.

11. The controller for the AC rotary machine according to claim 10, wherein an amplitude of the high-frequency voltage to be superimposed in the voltage superimposing means is set to have a value that is smaller at a time when the rotational speed of the AC rotary machine is high, than a value at a time when the rotational speed of the AC rotary machine is low.

12. The controller for the AC rotary machine according claim 2, wherein the controller further includes speed control means for generating the current instruction vector such that the estimated speed from the adaptive observation means coincides with an angular velocity instruction and for outputting the generated current instruction vector to the AC rotary machine control means.

* * * * *

UNITED STATES PATENT AND TRADEMARK OFFICE
CERTIFICATE OF CORRECTION

PATENT NO. : 8,525,454 B2
APPLICATION NO. : 13/255738
DATED : September 3, 2013
INVENTOR(S) : Yoshihiko Kimpara et al.

It is certified that error appears in the above-identified patent and that said Letters Patent is hereby corrected as shown below:

In the Specifications
Column 7, line 40, change "80" to --$\Theta$0--.
Column 7, line 46, change "80" to --$\Theta$0--.
Column 15, line 4, change "80" to --$\Theta$0--.
Column 16, line 62, change "n" to --$\pi$--.
Column 19, line 16, change "80" to --$\Theta$0--.
Column 23, line 66, change "80" to --$\Theta$0--.

Signed and Sealed this
Twenty-fourth Day of December, 2013

Margaret A. Focarino
*Commissioner for Patents of the United States Patent and Trademark Office*